(12) United States Patent
Kamai

(10) Patent No.: US 11,745,497 B2
(45) Date of Patent: Sep. 5, 2023

(54) IMAGE READING DEVICE, IMAGE READING METHOD, NON-TRANSITORY RECORDING MEDIUM STORING COMPUTER READABLE PROGRAM, AND IMAGE FORMATION DEVICE

(71) Applicant: Konica Minolta, Inc., Tokyo (JP)

(72) Inventor: Yasuyuki Kamai, Toyokawa (JP)

(73) Assignee: KONICA MINOLTA, INC., Tokyo (JP)

( * ) Notice: Subject to any disclaimer, the term of this patent is extended or adjusted under 35 U.S.C. 154(b) by 114 days.

(21) Appl. No.: 17/318,518

(22) Filed: May 12, 2021

(65) Prior Publication Data
US 2021/0354443 A1    Nov. 18, 2021

(30) Foreign Application Priority Data
May 15, 2020   (JP) ................................ 2020-085653

(51) Int. Cl.
| | |
|---|---|
| *H04N 1/00* | (2006.01) |
| *B41J 2/045* | (2006.01) |
| *B41J 2/165* | (2006.01) |
| *B41J 11/00* | (2006.01) |
| *H04N 1/409* | (2006.01) |

(52) U.S. Cl.
CPC ......... *B41J 2/0451* (2013.01); *B41J 2/16579* (2013.01); *B41J 11/003* (2013.01); *B41J 11/0035* (2013.01); *H04N 1/00716* (2013.01); *H04N 1/00755* (2013.01); *H04N 1/409* (2013.01)

(58) Field of Classification Search
CPC ...... B41J 2/0451; B41J 2/16579; B41J 2/003; B41J 2/0035; H04N 1/00716; H04N 1/00755; H04N 1/409
See application file for complete search history.

(56) References Cited

U.S. PATENT DOCUMENTS

| | | | | |
|---|---|---|---|---|
| 2015/0055964 | A1* | 2/2015 | Toso | .................. G03G 15/5062 |
| | | | | 399/15 |
| 2017/0289395 | A1* | 10/2017 | Ishiguro | ................. H04N 1/193 |
| 2018/0198937 | A1* | 7/2018 | Yoshizawa | ......... H04N 1/00702 |

FOREIGN PATENT DOCUMENTS

JP           2015058602 A         3/2015

* cited by examiner

*Primary Examiner* — Moustapha Diaby
(74) *Attorney, Agent, or Firm* — Cantor Colburn LLP

(57) ABSTRACT

It is intended to allow whether or not a noise included in a read image is a noise due to an ink ejection failure to be more reliably determined. An image reading device includes an image reading unit that reads an image formation surface of paper by using a reducing optical system and a control unit. The image reading unit includes a plurality of read sensors disposed at positions displaced from each other in a main scanning direction. The plurality of read sensors are disposed to be able to read the image formation surface by using at least a local region of the image formation surface as a common region to be read. The control unit determines, based on a first image obtained by a first read sensor included in the plurality of read sensors and on a second image obtained by a second read sensor included in the plurality of read sensors, an amount of displacement of a noise resulting from a parallax between the first read sensor and the second read sensor and determines, based on the amount of displacement, whether or not the noise is present on the image formation surface.

21 Claims, 17 Drawing Sheets

FIG. 17

ASSOCIATION

| NOISE | DISTANCE(mm) |
|---|---|
| 1 | 10.5 |
| 2 | 10 |
| 3 | 10.5 |
| 4 | 10.7 |
| 5 | 10.5 |
| 6 | 10.7 |

FIG. 18

UNIT:mm

| PARALLAX(D) | DISTANCE(Z) | CAMERA-TO-CAMERA DISTANCE(B) | FOCAL POINT DISTANCE(F) | |
|---|---|---|---|---|
| 3 | 10 | 10 | 3 | (FRONT SIDE) |
| 2.970297 | 10.1 | 10 | 3 | |
| 2.941176 | 10.2 | 10 | 3 | |
| 2.912621 | 10.3 | 10 | 3 | |
| 2.884615 | 10.4 | 10 | 3 | |
| 2.857143 | 10.5 | 10 | 3 | (IMAGE FORMATION SURFACE) |
| 2.830189 | 10.6 | 10 | 3 | |
| 2.803738 | 10.7 | 10 | 3 | |
| 2.777778 | 10.8 | 10 | 3 | |
| ... | | | | (REAR SIDE) |

FIG. 20

THRESHOLD TABLE

| THRESHOLD | CATEGORY |
|---|---|
| 10.3 mm OR LESS | FRONT SIDE |
| 10.5±0.1mm | IMAGE FORMATION SURFACE |
| 10.7 mm OR MORE | REAR SIDE |

IMAGE READING DEVICE, IMAGE READING METHOD, NON-TRANSITORY RECORDING MEDIUM STORING COMPUTER READABLE PROGRAM, AND IMAGE FORMATION DEVICE

CROSS-REFERENCE TO RELATED APPLICATIONS

The present invention claims priority under 35 U.S.C. § 119 to Japanese Patent Application No. 2020-085653, filed on May 15, 2020, the entire content of which is incorporated herein by reference.

TECHNOLOGICAL FIELD

The present invention relates to an image reading device, an image reading method, a non-transitory recording medium storing a computer readable program, and an image formation device.

BACKGROUND

There has been known an ink-jet image formation device which causes a plurality of nozzles to eject ink to form an image on a sheet. In an image formation device of this type, when an ink ejection failure occurs in any of nozzles, an image on a sheet has a missing portion corresponding to a position of the nozzle with the ejection failure (hereinafter referred to also as an "faulty nozzle"), and the missing portion remains as a missing nozzle defect.

As a technique of preventing degradation of an image quality due to the missing nozzle defect, a technique which specifies a position of the missing nozzle defect and compensates for an image to be formed with the faulty nozzle based on the specified position of the missing nozzle defect by using a nozzle adjacent to the faulty nozzle or a nozzle serving as a substitute for the faulty nozzle.

Japanese Unexamined Patent Application Publication 2015-58602 (Patent Literature 1) describes a known technique of determining the presence or absence of an ink ejection failure, while specifying a faulty nozzle associated with the ink ejection failure. Japanese Unexamined Patent Application Publication 2015-58602 (Patent Literature 1) also describes a technique of arranging an image reading unit on a downstream side of an ink-jet head in a direction of sheet conveyance and when it is determined that an image on a sheet read by the image reading unit has an ink ejection failure, analyzing the image and specifying the faulty nozzle.

CITATION LIST

[Patent Literature 1] Japanese Unexamined Patent Application Publication 2015-58602

SUMMARY

The missing nozzle defect remaining in an image on a sheet due to an ink ejection failure in a nozzle is a linear image defect (hereinafter referred to as a "linear defect") along the direction of sheet conveyance. When the image on the sheet with the linear detect is read by the image reading unit, a linear noise appears in an image obtained as a result of the reading. However, a factor causing the linear defect is not limited to the ink ejection failure in the nozzle. Accordingly, when the image on the sheet is read by the image reading unit, it is necessary to reliably determine whether or not the noise included in the read image (electronic data) is a noise due to the ink ejection failure in the nozzle.

However, the technique described in Patent Literature 1 has a problem to be solved such that, e.g., when dust is present at a position on the sheet different from an image formation surface of the sheet and the dust is read together with the image on the sheet by the image reading unit, whether or not a linear noise appearing in an image obtained as a result of the reading is a noise due to the ink ejection failure in the nozzle cannot be determined.

An object of the present invention is to provide an image reading device, an image reading method, a non-transitory recording medium storing a computer readable program, and an image formation device which allow whether or not a noise included in an image obtained as a result of reading when an image on a sheet is to be read by an image reading unit is a noise due to an ink ejection failure in a nozzle to be more reliably determined.

To achieve at least one of the abovementioned objects, according to an aspect of the present invention, an image reading device includes: an image reading unit that reads an image formation surface of a sheet by using a reducing optical system; and a control unit. The image reading unit includes a plurality of read sensors disposed at positions displaced from each other in a main scanning direction. The plurality of read sensors are disposed to be able to read the image formation surface by using at least a local region of the image formation surface as a common region to be read. The control unit determines, based on a first image obtained by a first read sensor included in the plurality of read sensors and on a second image obtained by a second read sensor included in the plurality of read sensors and different from the first read sensor, an amount of displacement of a noise resulting from a parallax between the first read sensor and the second read sensor and determines, based on the amount of displacement, whether or not the noise is present on the image formation surface.

To achieve at least one of the abovementioned objects, according to an aspect of the present invention, an image reading method using an image reading device including an image reading unit that reads an image formation surface of a sheet by using a reducing optical system and includes a plurality of read sensors disposed at positions displaced from each other in a main scanning direction, the plurality of read sensors being disposed to be able to read the image formation surface by using at least a local region of the image formation surface as a common region to be read, includes: determining, based on a first image obtained by a first read sensor included in the plurality of read sensors and on a second image obtained by a second read sensor included in the plurality of read sensors and different from the first read sensor, an amount of displacement of a noise resulting from a parallax between the first read sensor and the second read sensor; and determining, based on the amount of displacement, whether or not the noise is present on the image formation surface.

To achieve at least one of the abovementioned objects, according to an aspect of the present invention, a non-transitory recording medium storing a computer readable program for causing a computer of an image reading device including an image reading unit that reads an image formation surface of a sheet by using a reducing optical system and includes a plurality of read sensors disposed at positions displaced from each other in a main scanning direction, the plurality of read sensors being disposed to be able to read the image formation surface by using at least a local region of the image formation surface as a common region to be read, to execute: determining, based on a first image obtained by a first read sensor included in the plurality of read sensors and on a second image obtained by a second read sensor included in the plurality of read sensors and different from the first read sensor, an amount of displacement of a noise resulting from a parallax between the first read sensor and the second read sensor; and determining, based on the amount of displacement, whether or not the noise is present on the image formation surface.

To achieve at least one of the abovementioned objects, according to an aspect of the present invention, an image formation device that causes each of a plurality of nozzles to eject ink to form an image on a sheet, includes: an image reading unit that reads an image formation surface of the sheet by using a reducing optical system; and a control unit. The image reading unit includes a plurality of read sensors disposed at positions displaced from each other in a main scanning direction. The plurality of read sensors are disposed to be able to read the image formation surface by using at least a local region of the image formation surface as a common region to be read. The control unit determines, based on a first image obtained by a first read sensor included in the plurality of read sensors and on a second image obtained by a second read sensor included in the plurality of read sensors and different from the first read sensor, an amount of displacement of a noise resulting from a parallax between the first read sensor and the second read sensor and determines, based on the amount of displacement, whether or not the noise is present on the image formation surface.

According to the present invention, when an image on a sheet is to be read by the image reading unit, it is possible to more reliably determine whether or not noise included in an image obtained as a result of the reading is noise due to an ink ejection failure in a nozzle.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 17 is a diagram illustrating an example in which a distance calculated by a distance calculation unit and the noise are stored in association with each other;

FIG. 18 is a diagram illustrating dimensional relations among individual portions of the image reading unit in the image formation device according to the embodiment of the present invention;

FIG. 20 is a diagram illustrating an example of a threshold table.

DETAILED DESCRIPTION OF EMBODIMENTS

Figure 1:
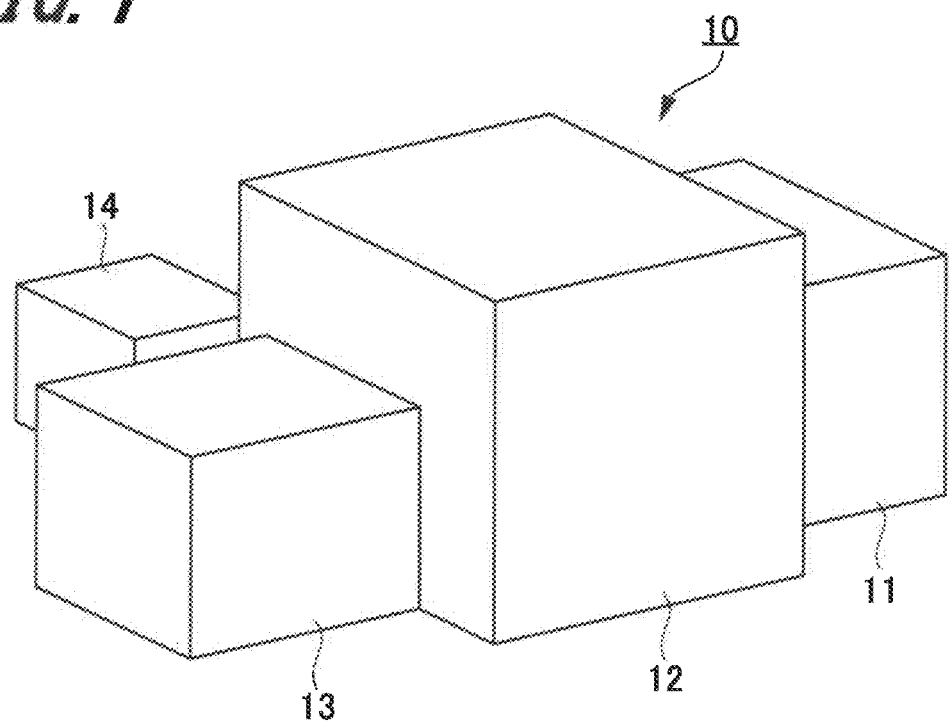
FIG. 1 is a schematic perspective view of an image formation device according to each of embodiments of the present invention.

Hereinafter, one or more embodiments of the present invention will be described with reference to the drawings. However, the scope of the invention is not limited to the disclosed embodiments. Referring to the drawings, a detailed description will be given of embodiments of the present invention. In the present specification and the drawings, components having substantially the same functions or configurations are denoted by the same reference numerals, and a repeated description thereof is omitted. In the following embodiments, paper will be described as an example of a sheet. The paper include white paper, black paper, colored paper, and the like. The sheet is not limited to the paper and may also be a resin sheet such as a transparent film, a fabric sheet, or the like. In the following description, the paper may also be referred to as the sheet.

FIG. 1 is a schematic perspective view of an image formation device according to each of the embodiments of the present invention.

As illustrated in FIG. 1, an image formation device 10 is an ink-jet recording device which causes a plurality of nozzles to eject ink to form (record) an image on paper. The image formation device 10 may be either a color image formation device or a monochrome image formation device. In the present embodiment, by way of example, a description will be given of a case where the image formation device 10 is the color image formation device.

The image formation device 10 is a device which forms the image on the sheet by using a one-pass ink-jet method. In the one-pass ink-jet method, an image is formed without causing a recording head unit having a plurality of nozzles to move in a main scanning direction. The main scanning direction refers to a direction perpendicular to a sub-scanning direction. The sub-scanning direction refers to a direction parallel with a direction of conveyance of the paper. The one-pass ink-jet method allows an image to be formed at a high speed in non-contact relation to a recording medium.

The image formation device 10 includes a paper feeding unit 11, an image formation unit 12, a paper ejection unit 13, and an ink supply tank 14. The paper feeding unit 11 is a portion which supplies the paper as the recording medium. The image formation unit 12 is a portion which forms an image on the paper by using ink. The paper ejection unit 13 is a portion which ejects the paper after the image was formed thereon. The ink supply tank 14 is a tank for storing a predetermined amount of the ink therein and supplying the ink to the image formation unit 12.

Figure 2:
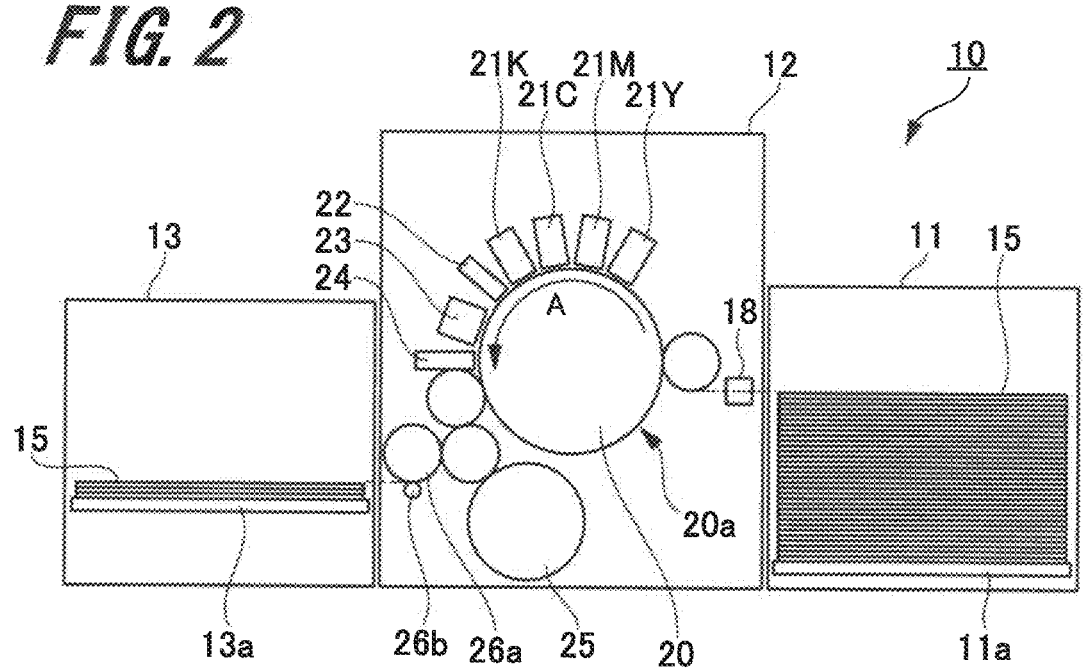
FIG. 2 is a schematic side view illustrating an inner structure of the image formation device illustrated in FIG. 1.

FIG. 2 is a schematic side view illustrating an inner structure of the image formation device illustrated in FIG. 1. The main scanning direction mentioned above corresponds to a direction of depth in FIG. 2.

As illustrated in FIG. 2, the paper feeding unit 11 has a paper feeding tray 11a. On the paper feeding tray 11a, sheets of paper 15 before an image is formed thereon or sheets of test paper having a predetermined pattern or image formed thereon are stacked. The paper feeding unit 11 sequentially separates the sheets of paper 15 stacked on the paper feeding tray 11a one by one from top to bottom and feeds the separated paper sheet.

The image formation unit 12 includes a conveyance drum 20 serving as a conveyance unit, a plurality of recording head units 21Y, 21M, 21C, and 21K, a mist catcher 22, a UV irradiation unit 23, an image reading unit 24, an inverting unit 25, and two larger and smaller conveyance rollers 26a and 26b.

The conveyance drum 20 is rotatively provided. The conveyance drum 20 rotates, while allowing the paper 15 fed from the paper feeding unit 11 to be wound around an outer peripheral surface 20a of the conveyance drum 20. For example, the conveyance drum 20 causes the paper 15 to be attracted to the outer peripheral surface 20a of the conveyance drum 20 by suction of air, and rotates in this state to convey the paper 15 in a conveyance direction A. To implement such a conveyance method, in the outer peripheral surface 20a of the conveyance drum 20, a plurality of air suction holes (not shown) are formed.

The plurality of recording head units 21Y, 21M, 21C, and 21K form (record) an image on the paper 15 serving as the recording medium by using inks in colors corresponding thereto. Specifically, the recording head unit 21Y uses yellow (Y) ink to form the image, while the recording head unit 21M uses magenta (M) ink to form the image. Meanwhile, the recording head unit 21C uses cyan (C) ink to form the image, while the recording head unit 21K uses black (K) ink to form the image. In the present embodiment, it is assumed by way of example that ultraviolet cure inks are used.

Each of the recording head units 21Y, 21M, 21C, and 21K is disposed over the conveyance drum 20 so as to face the outer peripheral surface 20a thereof. The individual recording head units 21Y, 21M, 21C, and 21K are disposed at respective positions displaced from each other in a circumferential direction of the conveyance drum 20. In the present embodiment, by way of example, the four recording head units 21Y, 21M, 21C, and 21K are provided in the image formation unit 12.

The mist catcher 22 is disposed on a downstream side of the recording head unit 21K in the conveyance direction A in which the paper 15 is conveyed by the conveyance drum 20. The mist catcher 22 collects mist generated through the ejection of the inks from respective ink-jet heads provided in the individual recording head units 21Y, 21M, 21C, and 21K. The UV irradiation unit 23 is disposed on the downstream side of the mist catcher 22 in the conveyance direction A in which the paper 15 is conveyed. The UV irradiation unit 23 irradiates the paper 15 conveyed thereto by the rotation of the conveyance drum 20 with UV light to cure the inks on the paper 15. The inks on the paper 15 mentioned herein refer to the inks forming the image on the paper 15. The UV irradiation unit 23 functions as a fixing unit that fixes the image formed on the paper 15 by using the inks. The fixation of the image by the fixing unit is not limited to that using the irradiation with the UV light, and may also be the fixation of the image using irradiation with an energy beam which may cure the inks depending on properties of the inks, the fixation of the image using heating of the paper 15 for drying the inks, or the like.

The image reading unit 24 is disposed on the downstream side of the UV irradiation unit 23 in the conveyance direction A in which the paper 15 is conveyed. The image reading unit 24 is a portion which performs reading on an image formation surface of the paper 15 by using a reducing optical system. The image formation surface of the paper 15 refers to a surface of the paper 15 facing each of the recording head units 21Y, 21M 21C, and 21K when the paper 15 is conveyed, while being attracted to the conveyance drum 20 by suction. On the image formation surface of the paper 15, the image is formed by using each of the recording head units 21Y, 21M, 21C, and 21K. The inverting unit 25 is a portion which vertically inverts the paper 15 to form the image on each side of the paper 15 or eject the paper 15 with the image formed on one side of the paper 15 facing downward. The conveyance rollers 26a and 26b refer to rollers which convey the paper 15 after the image was formed thereon toward the paper ejection unit 13.

The paper ejection unit 13 has a paper catch tray 13a. Onto the paper catch tray 13a, sheets of the paper 15 after the images were formed thereon are sequentially ejected.

Figure 3:
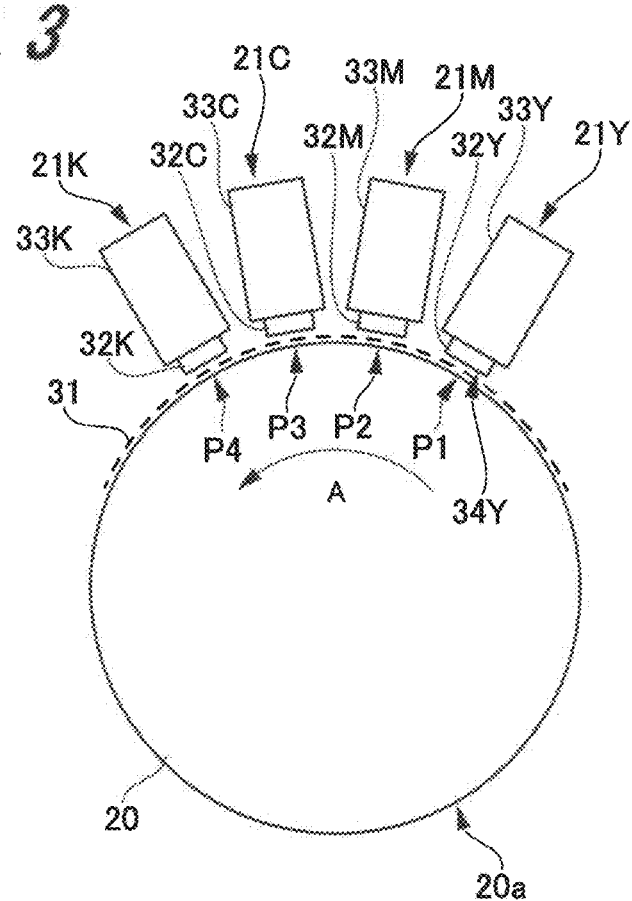
FIG. 3 is a schematic side view illustrating a portion of an image formation unit illustrated in FIG. 2 in enlarged relation.

FIG. 3 is a schematic side view illustrating a portion of the image formation unit illustrated in FIG. 2 in enlarged relation. In the following description, indexes Y, M, C, and K representing the colors of the inks are omitted except when the individual recording head units 21Y, 21M, 21C, and 21K and the components thereof need to be distinguished from each other by the colors of the inks.

As illustrated in FIG. 3, a conveyance path (denoted by a broken line in the drawing) 31 for conveying the recording medium is formed on the outer peripheral surface 20a of the conveyance drum 20. The paper 15 (see FIG. 2) serving as the recording medium is conveyed with the rotation of the conveyance drum 20, while being attracted to the outer peripheral surface 20a of the conveyance drum 20 by suction. Therefore, the conveyance path 31 is formed along the outer peripheral surface 20a of the conveyance drum 20.

Halfway in the conveyance path 31, image recording positions P1, P2, P3, P4, and P5 corresponding to the individual recording head units 21Y, 21M, 21C, and 21K are present. The image recording position P1 refers to a position at which the recording head unit 21Y records (forms) the image, while the image recording position P2 refers to a position at which the recording head unit 21M records the image. The image recording position P3 refers to a position at which the recording head unit 21C records the image, while the image recording position P4 refers to a position at which the recording head unit 21K records the image.

When the paper 15 is conveyed along the conveyance path 31, a leading end of the paper 15 first passes through the image recording position P1 corresponding to the recording head unit 21Y, and then sequentially passes through the image recording positions P2, P3, and P4 corresponding to the other recording head units 21M, 21C, and 21K. Then, when the four recording head units 21Y, 21M, 21C, and 21K eject the inks with predetermined timings, the yellow ink adheres to the paper 15 at the image recording position P1, and the magenta ink adheres to the paper 15 at the image recording position P2. Then, the cyan ink adheres to the paper 15 at the image recording position P3, and the black ink adheres to the paper 15 at the image recording position P4.

The recording head unit 21Y includes an ink-jet head 32Y and a carriage 33Y holding the ink-jet head 32Y. The ink-jet head 32Y has an ink ejection surface 34Y and ejects the ink from nozzles 244 (see FIG. 4) provided in the ink ejection surface 34Y. The ink ejection surface 34Y of the ink-jet head 32Y is disposed, while facing the outer peripheral surface 20a of the conveyance drum 20.

Figure 4:
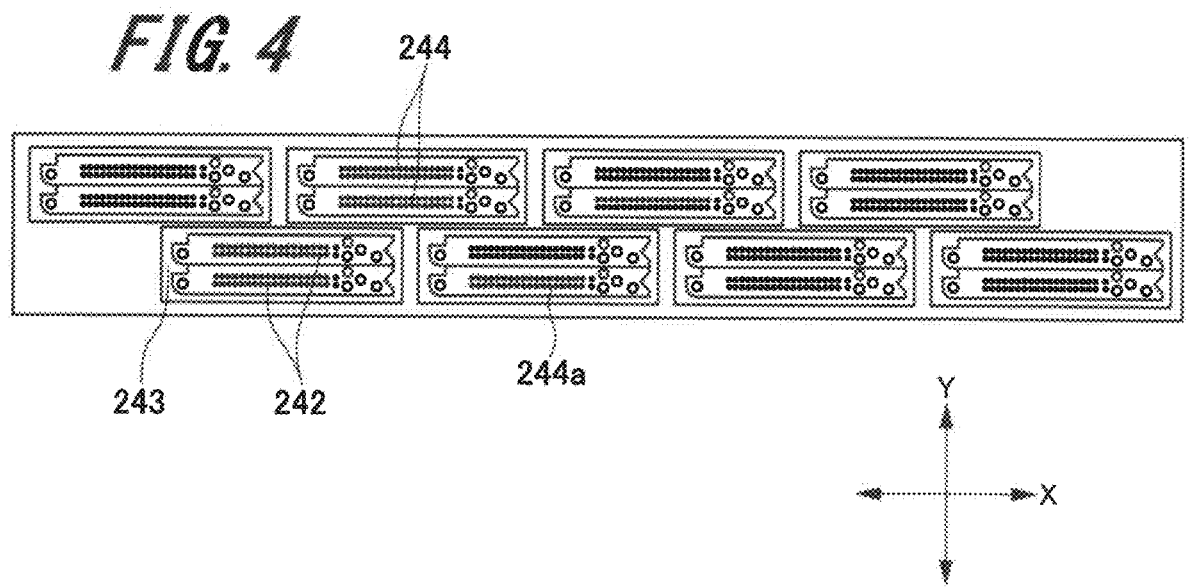
FIG. 4 is a diagram illustrating a state in which a plurality of ink-jet modules are disposed.

In the ink ejection surface 34Y of the ink-jet head 32Y, as illustrated in, e.g., FIG. 4, a plurality of ink-jet modules 243 are provided. The plurality of ink-jet modules 243 are arranged in a staggered configuration. In each of the ink-jet modules 243, two nozzle units 242 are provided. In each of the nozzle units 242, the plurality of nozzles 244 are provided. The nozzles 244 are portions which eject the ink. When the image is formed on the paper 15 by the ink-jet head 32Y, the nozzles 244 are selected based on image data specified by a print job, and the ink is ejected from the selected nozzles 244 toward the paper 15. Note that an X-direction illustrated in FIG. 4 corresponds to the main scanning direction, while a Y-direction illustrated in FIG. 4 corresponds to the sub-scanning direction.

Similarly to the recording head unit 21Y described above, the recording head unit 21M includes an ink-jet head 32M and a carriage 33M holding the ink-jet head 32M. Also, the recording head unit 21C includes an ink-jet head 32C and a carriage 33C holding the ink-jet head 32C, while the recording head unit 21K includes an ink-jet head 32K and a carriage 33K holding the ink-jet head 32K.

Figure 5:
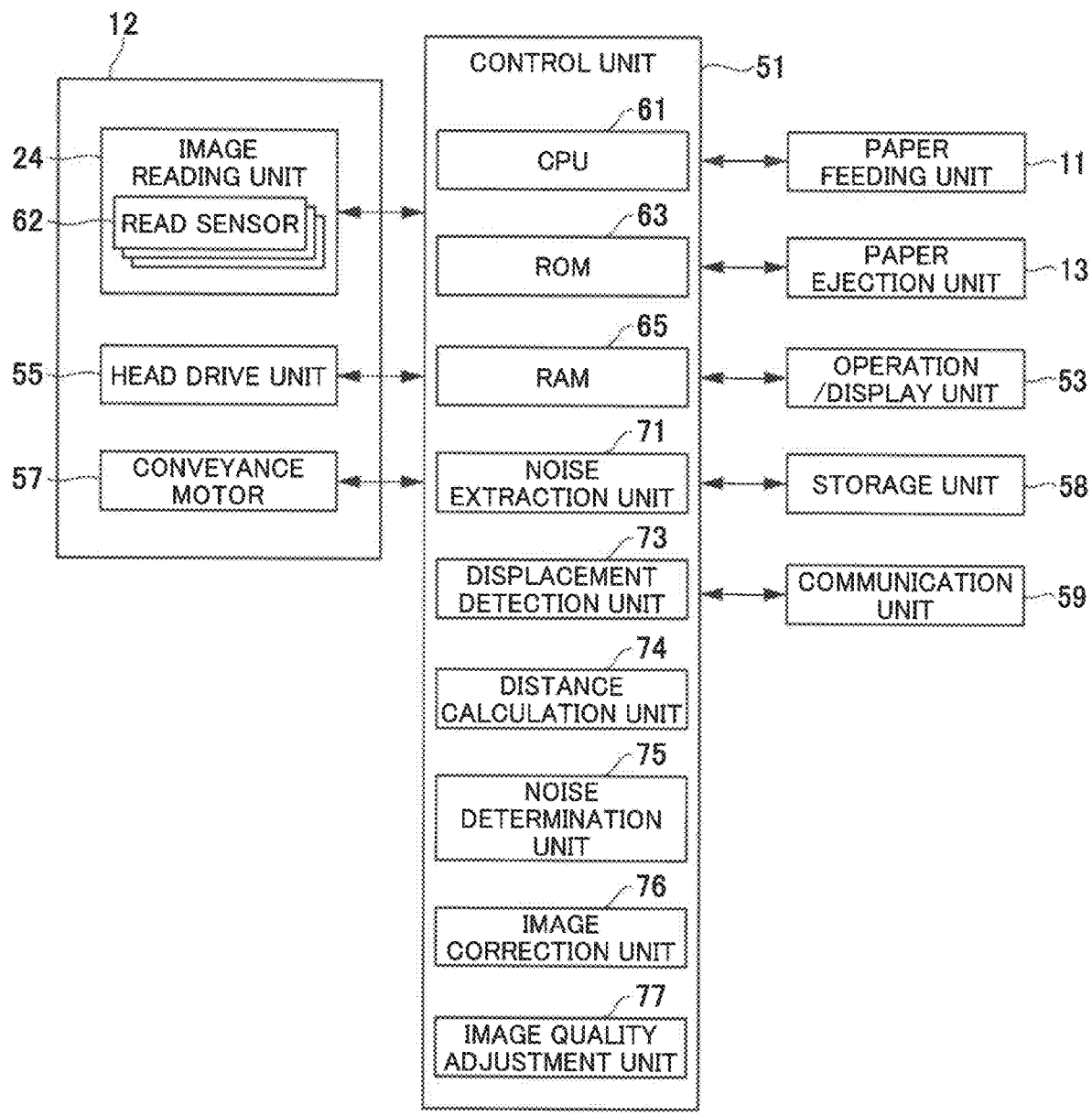
FIG. 5 is a block diagram illustrating an example of a configuration of a control system of the image formation device according to the embodiment of the present invention.

FIG. 5 is a block diagram illustrating an example of a configuration of a control system of the image formation device according to the embodiment of the present invention.

As illustrated in FIG. 5, the image formation device 10 includes not only the paper feeding unit 11, the image formation unit 12, and the paper ejection unit 13, but also a control unit 51, an operation/display unit 53, a storage unit 58, and a communication unit 59.

The image formation unit 12 includes, in addition to the image reading unit 24 described above, a head drive unit 55 and a conveyance motor 57. The image reading unit 24 includes a plurality of read sensors 62. Each of the read sensors 62 is an image sensor that optically reads an image via the reducing optical system described later, which is specifically a linear image sensor in which photoelectric conversion elements are arranged in a linear configuration. The image reading unit 24 has a surface serving as a reference when the image formation surface of the paper 15 is read, i.e., a read reference surface. The read reference surface of the image reading unit 24 is set at a position at a given distance apart from an imaging surface of each of the read sensors 62.

Each of the read sensors 62 is formed of, e.g., a CCD (Charge Coupled Device) sensor, a CMOS (Complementary Metal Oxide Semiconductor) sensor, or the like. When reading the image formed on the paper 15, the read sensor 62 outputs image data obtained as a result of the reading at three wavelengths of, e.g., R (red), G (green), and B (blue) light. In terms of obtaining the effects of the present embodiment, the read sensor 62 may be either a color image sensor or a monochrome image sensor.

The head drive unit 55 independently drives each of the ink-jet heads 32Y, 32M, 32C, and 32K based on a control instruction given thereto from the control unit 51. The conveyance motor 57 includes a motor for conveying the paper 15 and rotating the conveyance drum 20. The driving of the conveyance motor 57 is controlled by the control unit 51.

The control unit 51 includes a CPU (Central Processing Unit) 61, a ROM (Read Only Memory) 63, and a RAM (Random Access Memory) 65. The control unit 51 causes the CPU 61 to read a predetermined control program from the ROM 63 into the RAM 65 and execute the predetermined control program to perform overall control of operations of the individual units of the image formation device 10. The control unit 51 transmits/receives various data to/from an external device (such as, e.g., a personal computer) connected to a communication network not shown. When receiving the print job from the operation/display unit 53 or the external device, the control unit 51 controls the operations of the individual units of the image formation device 10 so as to form an image on the paper 15 based on the image data specified by the print job.

The control unit 51 also determines an amount of displacement of a noise resulting from a parallax between the first read sensor 62a and the second read sensor 62b based on a first image 81a obtained by a first read sensor 62a described later and on a second image 81b obtained by a second read sensor 62b described above to determine whether or not the noise is present on the image formation surface of the paper 15 based on the amount of displacement. As functional units therefor, the control unit 51 includes a noise extraction unit 71, a displacement detection unit 73, a distance calculation unit 74, and a noise determination unit 75. The control unit 51 further includes an image correction unit 76 and an image quality adjustment unit 77. Each of the functional units (71, 73, 74, 75, 76, and 77) is implemented by the CPU 61 by reading a predetermined program from the ROM 63 into the RAM 65 and executing the predetermined program.

The noise extraction unit 71 is a portion which extracts a noise from an image (hereinafter referred to also as a "first image") obtained by a predetermined one of the plurality of read sensors 62 described above. The displacement detection unit 73 is a portion which specifies a position on an image (hereinafter referred to also as a "second image") obtained by another read sensor 62 different from the predetermined read sensor 62 described above at which the noise extracted by the noise extraction unit 71 is present and also detects, based on information about the specified position, an amount of displacement corresponding to an amount of displacement (parallax) between a position (in the main scanning direction) on the first image at which the noise is present and the position (in the main scanning direction) on the second image at which the noise is present.

The distance calculation unit 74 is a portion which calculates, based on the above-mentioned amount of displacement detected by the displacement detection unit 73, a distance from the read reference surface of the image reading unit 24 to a generation source of the noise. The noise determination unit 75 is a portion which determines, based on the above-mentioned distance calculated by the distance calculation unit 74, whether or not the noise is present on the image formation surface.

The image correction unit 76 is a portion which corrects a missing portion of an image due to a missing nozzle defect. The image quality adjustment unit 77 is a portion which adjusts a quality of the image formed on the paper 15. The image quality adjustment unit 77 adjusts, e.g., a density, a position, an inclination, and the like of the image as adjustment parameters associated with the quality of the image, i.e., image quality. Details of each of the functional units will be described later.

The operation/display unit 53 is formed of, e.g., a liquid crystal display with a touch panel. The operation/display unit 53 has a function of displaying various information to a user and a function of receiving various input operations from the user. The information displayed on the operation/display unit 53 includes various operation screens, a setting screen, a reporting screen, and the like. The input operations performed by the user by using the operation/display unit 53 include an operation of giving an instruction to execute the print job, an operation of selecting (specifying) the image data for which the print job is intended, an operation of selecting (specifying) a type of the paper 15 to be used for the print job, an operation of selecting conditions to be applied to the print job, and the like.

The storage unit 58 is formed of, e.g., a nonvolatile semiconductor memory (so-called flash memory), a hard disk, or the like. The storage unit 58 stores therein control data to be referred to by the control unit 51 when performing various control processing and other data.

The communication unit 59 is communicatively connected to the external device (such as, e.g., a personal computer) via the communication network not shown to transmit/receive various data to/from the external device. The communication unit 59 is formed of various interfaces such as, e.g., NIC (Network Interface Card), a MODEM (MOdulator-DEModulator), and a USB (Universal Serial Bus).

A description will be given herein of a reference mode of the present invention.

Figure 6:
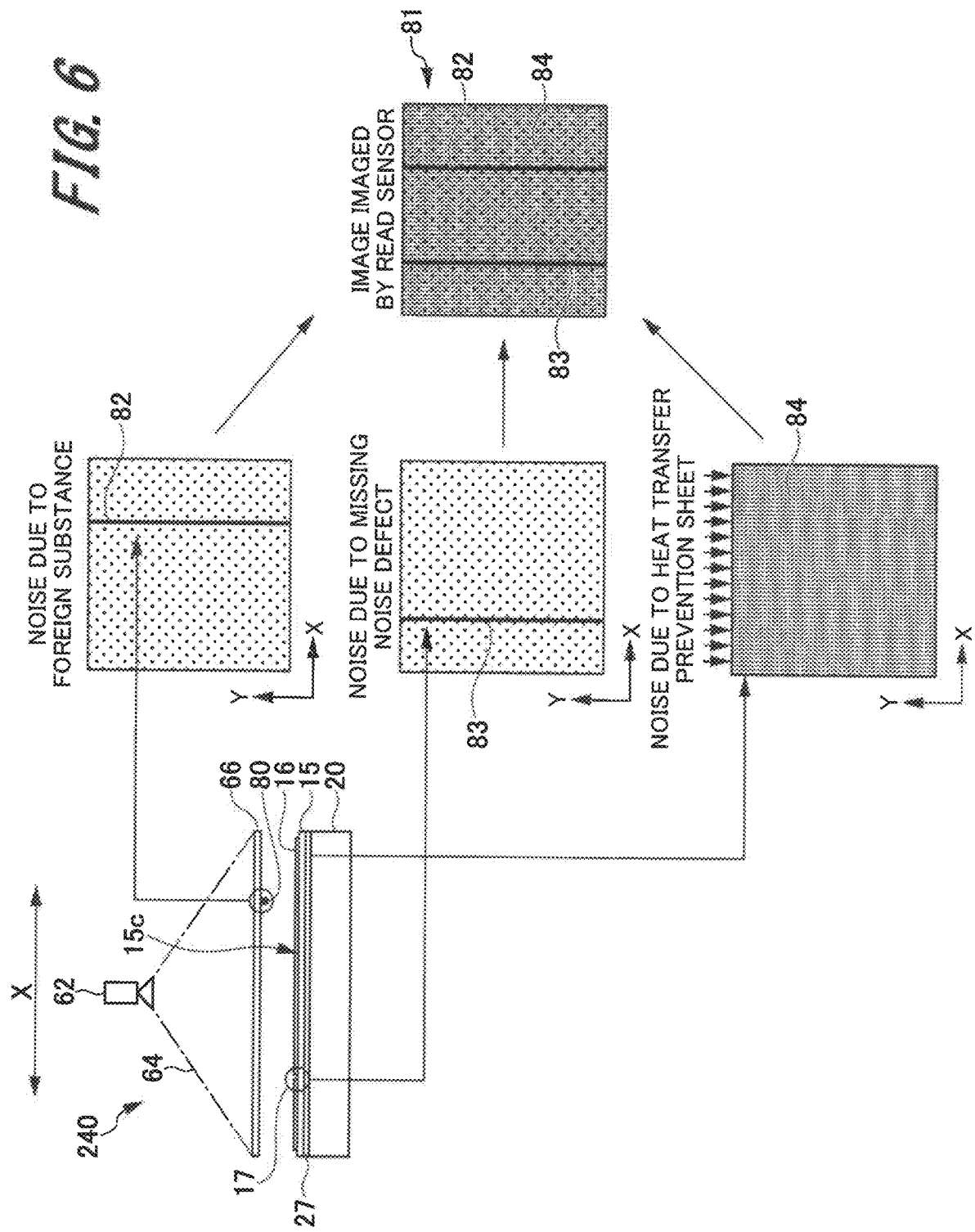
FIG. 6 is a schematic diagram illustrating a configuration of a main portion of an image formation device according to a reference mode of the present invention.

FIG. 6 is a schematic diagram illustrating a configuration of a main portion of an image formation device according to the reference mode of the present invention.

As illustrated in FIG. 6, the outer peripheral surface 20a (see FIG. 2) of the conveyance drum 20 is covered with a heat transfer prevention sheet 27. The heat transfer prevention sheet 27 is interposed between the paper 15 and the conveyance drum 20 to prevent heat transfer between the paper 15 and the conveyance drum 20 when the paper 15 is conveyed while being attracted to the outer peripheral surface 20a of the conveyance drum 20 by suction. Since a viscosity of the ink ejected from an ink-jet head 32 is susceptible to a temperature, to maintain an excellent quality of the image formed on the paper 15, it is required to control respective temperatures of the ink-jet head 32, the paper 15, and the conveyance drum 20 to appropriate levels. At that time, when heat easily transfers between the conveyance drum 20 and the paper 15 and between the conveyance drum 20 and the ink-jet head 32, it is difficult to appropriately control the temperatures of the individual units. Accordingly, by covering the outer peripheral surface 20a of the conveyance drum 20 with the heat transfer prevention sheet 27, heat is prevented from transferring between the conveyance drum 20 and the paper 15 and between the conveyance drum 20 and the ink-jet head 32.

The heat transfer prevention sheet 27 is formed of a sheet having a low heat conductivity. Specifically, the heat transfer prevention sheet 27 is formed of a resin sheet made of a synthetic resin or the like and, more specifically, the heat transfer prevention sheet 27 is formed of a fluorine resin sheet or the like. The conveyance drum 20 attracts the paper 15 by suction by using a sucking force of air. Accordingly, the heat transfer prevention sheet 27 is formed of a porous sheet, a porous film, or the like formed in a lattice pattern (netlike pattern) as illustrated in, e.g., FIG. 7 so as to have an appropriate air permeability.

Figure 7:
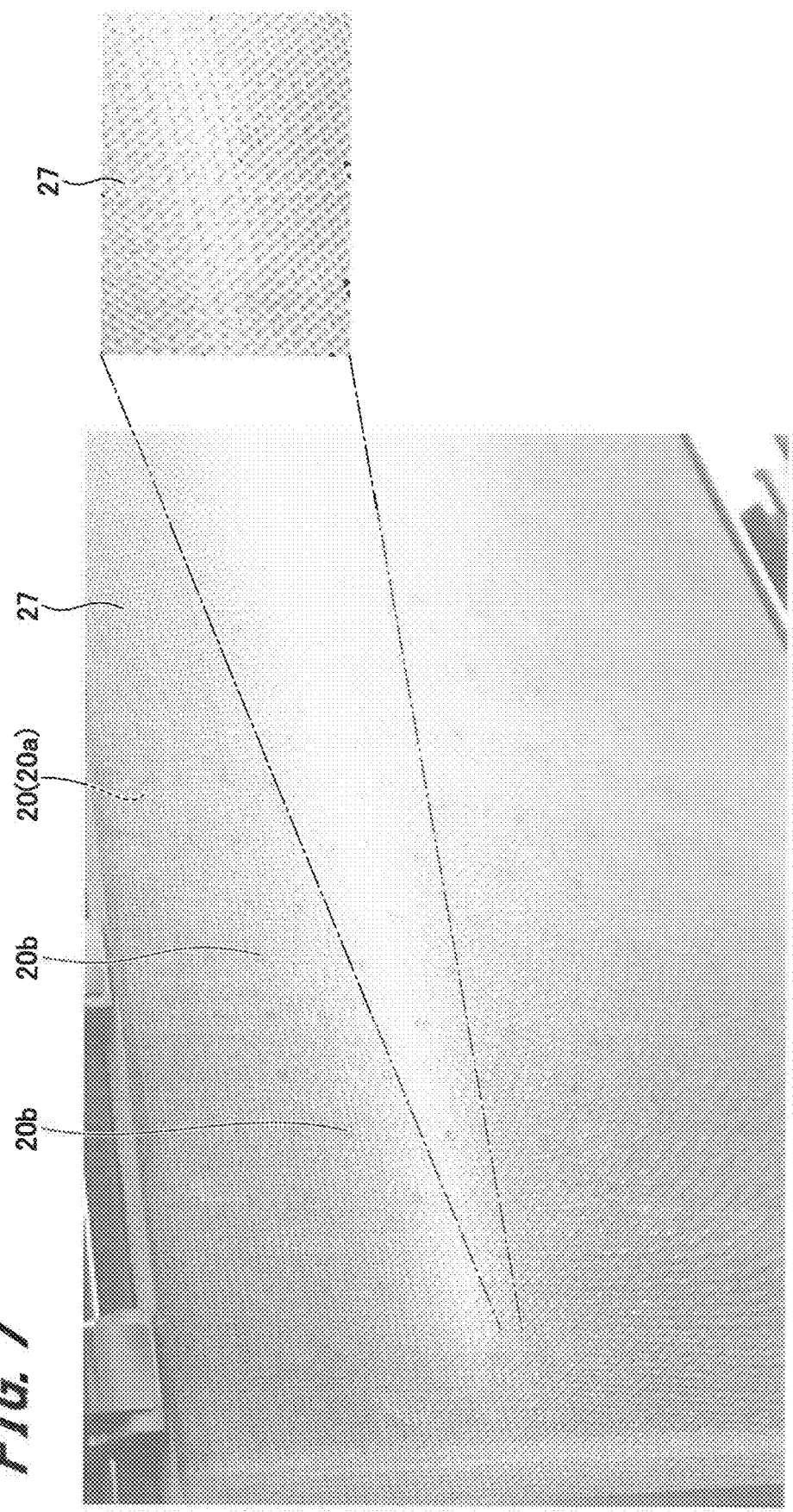
FIG. 7 is a diagram illustrating a heat transfer prevention sheet covering a conveyance drum.

Note that, in FIG. 7, the outer peripheral surface 20a of the conveyance drum 20 is covered with the heat transfer prevention sheet 27, and air suction holes 20b of the conveyance drum 20 are transparently seen in a spotted pattern through the heat transfer prevention sheet 27. Also, in FIG. 7, a portion of the heat transfer prevention sheet 27 is displayed in enlarged relation on the right side of the drawing.

An image reading unit 240 is a portion which optically reads an image formation surface 15c of the paper 15. FIG. 6 illustrates a state in which an image 16 is formed on the image formation surface 15c of the paper 15, and a missing nozzle defect 17 is present in the image 16. The missing nozzle defect 17 is a missing portion of the image 16 resulting from an ink ejection failure in any of the nozzles 244.

The image reading unit 240 includes the read sensor 62, a reducing optical system 64, a reading plate 66, and a light source (not shown). In the reference mode, the only one read sensor 62 is provided in the image reading unit 240, and the only one reducing optical system 64 is provided correspondingly thereto.

The reducing optical system 64 includes a condensing lens not shown. The reducing optical system 64 condenses light reflected from a surface to be read with the condensing lens to form an image on the imaging surface of the read sensor 62. The reference mode assumes a case in which the surface to be read is the image formation surface 15c of the paper 15. The reading plate 66 is formed of, e.g., a transparent glass plate. The reference mode assumes a case where a foreign substance 80 adheres to the reading plate 66. Examples of the foreign substance 80 include mist, dust, paper powder, and the like. The light source irradiates the surface to be read with reading light (e.g., white light), and is formed of a linear lighting device or the like. The linear lighting device emits linear light, and is formed by using a light emitting diode or the like.

In the image formation device according to the reference mode of the present invention, when the read sensor 62 reads the image 16 on the paper 15 conveyed by the conveyance drum 20 via the reducing optical system 64, the missing nozzle defect 17 present in the image 16 and the foreign substance 80 adhering to the reading plate 66 are read together with the image 16. In addition, when the paper 15 is thin paper or the like, the read sensor 62 reads the lattice pattern of the heat transfer prevention sheet 27 through the thin paper. When the read sensor 62 actually reads the image formation surface 15c of the paper 15, an image 81 as illustrated on a right side of FIG. 6 is obtained. The image 81 is electronic data of an imaged image obtained as a result of the reading by the read sensor 62, and can also be referred to as the image data.

The image 81 obtained by the read sensor 62 includes a noise 82 due to the foreign substance 80, a noise 83 due to the missing nozzle defect 17, and a noise 84 due to the lattice pattern of the heat transfer prevention sheet 27. These noises 82, 83, and 84 appear while being superimposed on the one image 81. The noise 82 due to the foreign substance 80 is a linear noise extending in parallel with the sub-scanning direction Y, and the noise 83 due to the missing nozzle defect 17 is also a linear noise extending in parallel with the sub-scanning direction Y. The noise 84 due to the lattice pattern of the heat transfer prevention sheet 27 is noise appearing in the form of moire.

As a technique of preventing degradation of an image quality due to the missing nozzle defect, a technique of specifying a position of the missing nozzle defect to estimate a position of a faulty nozzle and compensate for an image to be formed by the faulty nozzle by using a nozzle adjacent to the faulty nozzle or a nozzle serving as a substitute for the faulty nozzle is known. The known technique can eliminate or reduce the missing nozzle defect. However, to use this known technique, it is required to reliably specify the position of the missing nozzle defect.

However, in the image formation device according to the reference mode of the present invention, when the image 81 obtained by the read sensor 62 includes the noises 82 and 84 other than the noise 83 due to the missing nozzle defect 17, it is difficult to reliably specify the position of the missing nozzle defect 17. Specifically, each of the noise 83 due to the missing nozzle defect 17 and the noise 82 due to the foreign substance 80 is present as linear noise in the image 81. Consequently, it is impossible to determine whether or not each of the noise 82 and the noise 83 is the noise due to the missing noise defect 17. In addition, when the paper 15 is thin paper or the like, the noise 84 due to the heat transfer prevention sheet 27 is superimposed on the image 81, and therefore it is increasingly difficult to determine the noise.

Figure 8:
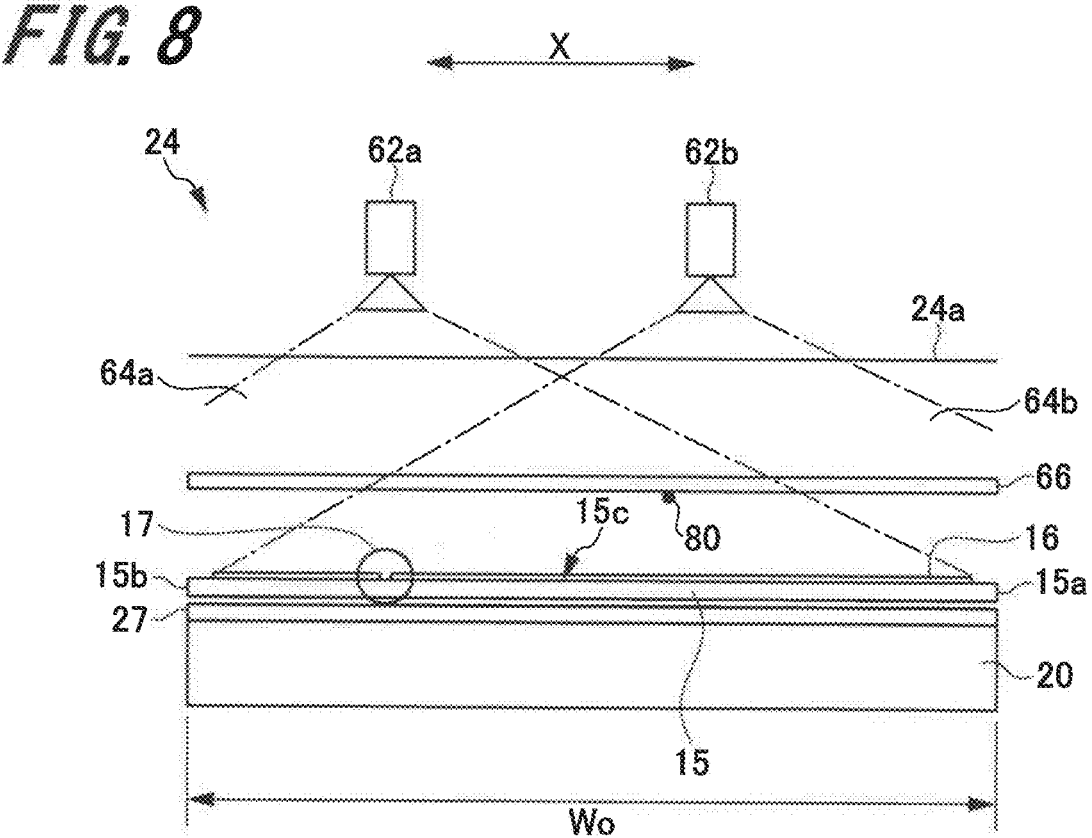
FIG. 8 is a schematic diagram illustrating a configuration of a main portion of the image formation device according to the embodiment of the present invention.

FIG. 8 is a schematic diagram illustrating a configuration of a main portion of the image formation device according to the embodiment of the present invention. As illustrated in FIG. 8, the image reading unit 24 includes the two read sensors 62a and 62b, two reducing optical systems 64a and 64b, the reading plate 66, and the light source (not shown). The reading plate 66 and the light source are as described above in the reference mode. By way of example, the embodiment of the present invention will describe a case where the image reading unit 24 includes the two read sensors 62a and 62b, but the number of the read sensors 62 included in the image reading unit 24 may also be 3 or more.

The read sensors 62a and 62b are disposed at positions displaced from each other in the main scanning direction X. A read reference surface 24a of the image reading unit 24 is set between imaging surfaces 90a and 90b (see FIG. 16) of the read sensors 62a and 62b and the reading plate 66. The image reading unit 24 reads an image in accordance with a so-called stereo camera method which simultaneously photographs an object to be photographed in different directions by using the two read sensors 62a and 62b. In the description given below, the read sensors 62a and 62b are referred to as the "first read sensor 62a" and the "second sensor 62b", respectively. When there is no need to particularly distinguish the first and second read sensors 62a and 62b from each other, each of the read sensors 62a and 62b is referred to as the "read sensor 62". Note that, in the sub-scanning direction, the read sensors 62a and 62b are preferably at the same position, but may also be at different positions. Also, in a vertical direction, the read sensors 62a and 62b are preferably at the same position, but may also be at different positions. The vertical direction mentioned herein refers to a direction perpendicular to each of the main scanning direction X and the sub-scanning direction.

The reducing optical system 64a is provided correspondingly to the first read sensor 62a, while the reducing optical system 64b is provided correspondingly to the second read sensor 62b. The reducing optical system 64a is an optical system which condenses light reflected from the surface to be read with a condensing lens to form an image on an imaging surface of the first read sensor 62a. The reducing optical system 64b is an optical system which condenses the light reflected from the surface to be read with a condensing lens to form an image on an imaging surface of the second read sensor 62b. In the description given below, the reducing optical system 64a is referred to as the "first reducing optical system 64a", while the reducing optical system 64b is referred to as the "second reducing optical system 64b".

The first read sensor 62a reads the surface to be read via the first reducing optical system 64a to generate the first image 81a corresponding to the image data showing a result of the reading. The second read sensor 62b reads the surface to be read via the second reducing optical system 64b to generate the second image 81b corresponding to the image data showing a result of the reading. The surface to be read is as described above in the reference mode.

A viewing angle in the main scanning direction X resulting from the first read sensor 62a is set such that, when the paper 15 having a maximum width that can be conveyed by the conveyance drum 20 is conveyed, an end portion 15a of the paper 15 in a width direction thereof is located at an end of a viewing field. Meanwhile, a viewing angle in the main scanning direction X resulting from the second read sensor 62b is set such that another end portion 15b of the above-mentioned paper 15 having the maximum width in the width direction thereof is located at an end of a viewing field. The viewing field of the first read sensor 62a in the main scanning direction X is set wider than a width dimension of the above-mentioned paper 15 having the maximum width, and the viewing field of the second read sensor 62b in the main scanning direction X is also set wider than the width dimension of the above-mentioned paper 15 having the maximum width.

Accordingly, in the image reading unit 24, the first read sensor 62a is configured to be able to read an entire region of the image 16 formed on the paper 15, and the second read sensor 62b is also configured to be able to read the entire region of the image 16 formed on the paper 15. In other words, the first read sensor 62a and the second read sensor 62b are disposed to be able to read an entire region of the image formation surface 15c of the paper 15 as a common region to be read.

Note that, by way of example, the present embodiment will describe a case where the entire region of the image formation surface 15c of the paper 15 is used as the common region to be read. However, the common region to be read when the first read sensor 62a and the second read sensor 62b read the image formation surface 15c of the paper 15 may also be a portion of the image formation surface 15c.

Subsequently, referring to FIGS. 8 and 9, a description will be given of influence exerted by distances from the read sensors 62a and 62b to the generation source of the noise (hereinafter referred to also as the "noise generation source") in a direction perpendicular to the main scanning direction X on a position of the noise appearing in the first image 81a and on a position of the noise appearing in the second image 81b.

First, as illustrated in FIG. 8, the image reading unit 24 reads an image in accordance with the stereo camera method using the plurality of (two in the present mode example) read sensors 62a and 62b. Accordingly, with respect to a given noise generation source, a position on the imaging surface of the first read sensor 62a at which an image of the noise generation source is formed and a position on the imaging surface of the second read sensor 62b at which an image of the noise generation source is formed are displaced from each other in the main scanning direction X. Consequently, with regard to the given noise generation source, a position of noise observed in the first image 81a and a position of noise observed in the second image 81b are also displaced from each other in the main scanning direction X.

Figure 9:
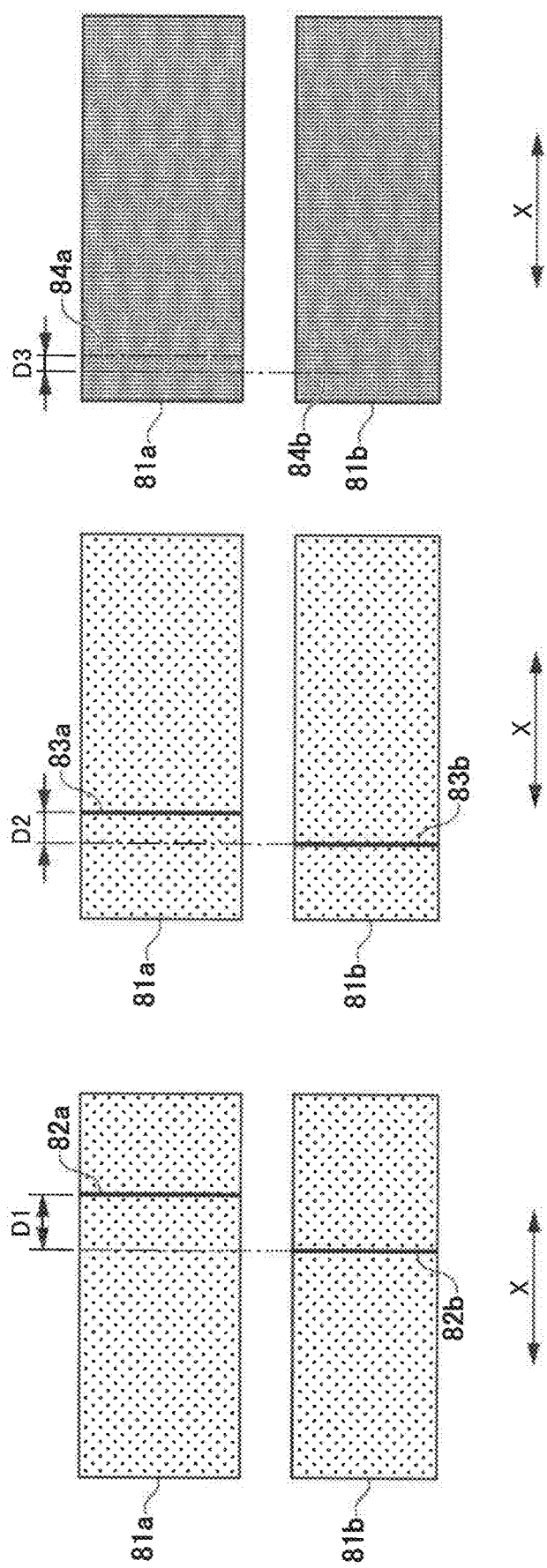
FIG. 9 is a schematic diagram for illustrating influence exerted by a distance from a read sensor to a noise generation source on a position of a noise.

As illustrated in FIGS. 8 and 9, when the foreign substance 80 adhering to the reading plate 66 causes a noise 82a in the first image 81a and causes a noise 82b in the second image 81b, an amount of displacement between the noises 82a and 82b in the main scanning direction X is assumedly denoted by D1 (mm). Meanwhile, when the missing nozzle defect 17 caused on the paper 15 by an ink ejection failure in one of the nozzles 244 causes a noise 83a in the first image 81a and causes a noise 83b in the second image 81b, an amount of displacement between the noises 83a and 83b in the main scanning direction X is assumedly denoted by D2 (mm). In addition, when the surface pattern of the heat transfer prevention sheet 27 seen through the paper 15 causes a noise 84a in the first image 81a and causes a noise 84b in the second image 81b, a displacement between the noises 84a and 84b in the main scanning direction X is assumedly denoted by D3 (mm). In that case, a magnitude relationship among the amounts of displacement D1, D2, and D3 is given by D1>D2>D3. In other words, with regard to a given noise generation source, an amount of displacement between a position of a noise observed in the first image 81a and a position of a noise observed in the second image 81b is larger as the noise generation source viewed from the read sensors 62a and 62b is closer.

Figure 10:
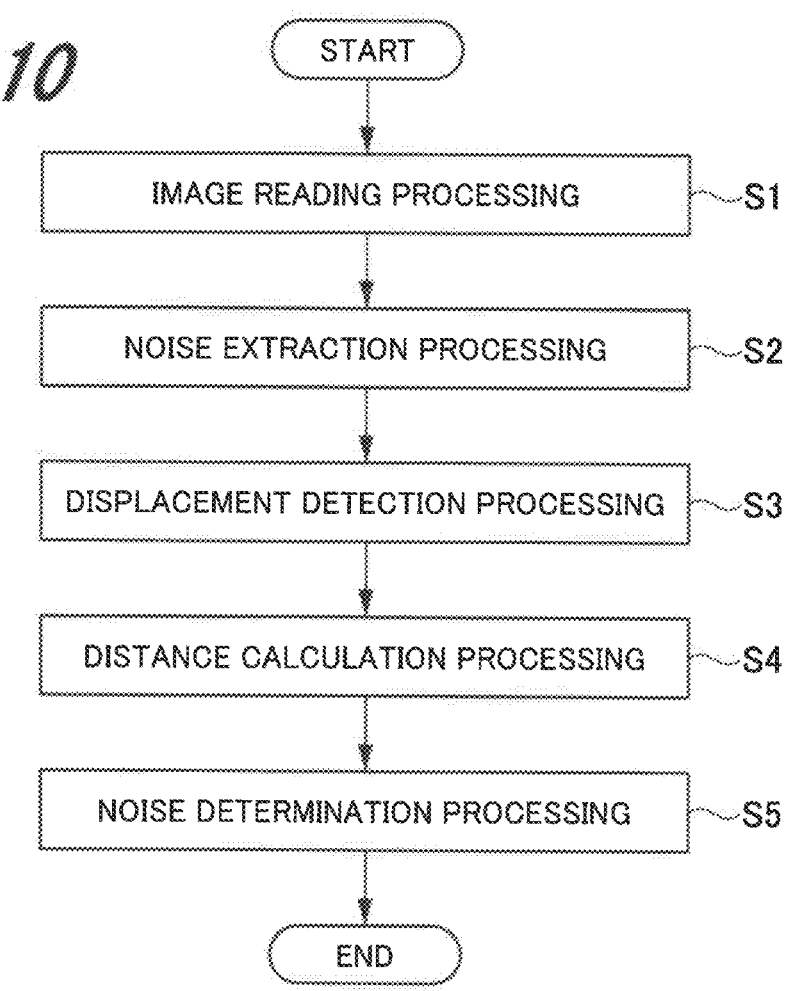
FIG. 10 is a flow chart illustrating an example of procedures of processing by the image formation device according to the embodiment of the present invention.

FIG. 10 is a flow chart illustrating an example of procedures of processing by the image formation device according to the embodiment of the present invention.

As illustrated in FIG. 10, the image formation device 10 sequentially performs image reading processing S1, noise extraction processing S2, displacement detection processing S3, distance calculation processing S4, and noise determination processing S5. A description will be given below of each processing.

(Image Reading Processing)

The image reading processing S1 is processing to be performed by the image reading unit 24. The image reading unit 24 reads the image formation surface 15c of the paper 15 conveyed by the conveyance drum 20 with the first read sensor 62a and the second read sensor 62b. At this time, the first image 81a obtained by the first read sensor 62a is stored in the RAM 65, and the second image 81b obtained by the second read sensor 62b is also stored in the RAM 65.

(Noise Extraction Processing)

The noise extraction processing S2 is processing to be performed by the noise extraction unit 71.

The noise extraction unit 71 extracts at least any one of a noise due to mist, dust, or paper powder present between the image formation surface 15c of the paper 15 and the read reference surface 24a of the image reading unit 24, a noise due to the missing noise defect 17 appearing on the image formation surface 15c of the paper 15, a noise due to the conveyance drum 20 serving as the sheet conveyer, and a noise due to the heat transfer prevention sheet 27 covering the surface of the conveyance drum 20.

Figure 11:
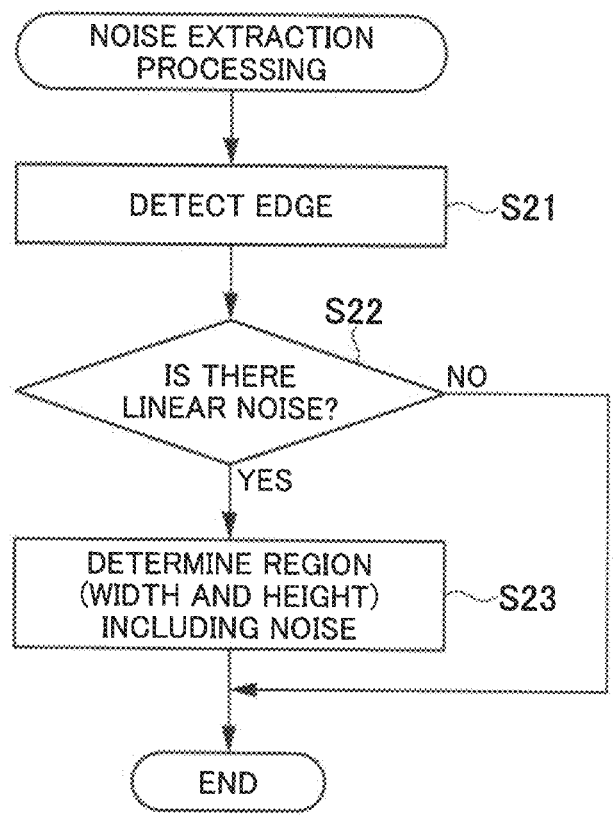
FIG. 11 is a flow chart illustrating the procedure of noise extraction processing.

FIG. 11 is a flow chart illustrating the procedure of the noise extraction processing S2.

First, the noise extraction unit 71 performs edge detection processing by using the first image 81a stored together with the second image 81b in the RAM 65 as described above (Step S21). The first image 81a to be subjected to edge detection is an image having three channels of R (red), G (green), and B (blue), and according the noise extraction unit 71 first converts the first image 81a into one channel through gray scale conversion. As a result, the first image 81a represented by black and white densities is obtained. At this time, the second image 81b is also converted into one channel through the gray scale conversion. Then, the noise extraction unit 71 performs primary differential filter processing and secondary differential filter processing on the first image 81a obtained through the gray scale conversion to detect edges present in the first image 81a.

Then, the noise extraction unit 71 determines, based on a result of the edge detection processing, whether or not the first image 81a includes a linear noise (Step S22). The "linear noise" mentioned herein means a linear noise extending in parallel with the sub-scanning direction Y. Accordingly, when at least one of the edges detected by the edge detection processing is an edge continuously extending in the sub-scanning direction Y, i.e., linear noise, the noise extraction unit 71 determines that there is a linear noise (YES is given as an answer in Step S22), subsequently, processing in Step S23 is performed, and then the noise extraction processing S2 is ended. When there is no edge continuously extending in the sub-scanning direction Y, the noise extraction unit 71 determines that there is no linear noise (NO is given as an answer in Step S22), and the noise extraction processing S2 is ended.

In Step S23, the noise extraction unit 71 determines a region including the linear noise described above to be an image matching region. The image matching region is a local region of the first image 81a, and a size of the image matching region corresponds to a size of an image region to be shifted over the second image 81b in image matching processing described later. The size of the image matching region is defined by a width of the region in the main scanning direction X and a height of the region in the sub-scanning direction Y, and the width and height of the region are determined in Step S23. In Step S23, when the size of the image matching region is determined by a width of the region corresponding to M pixels in the main scanning direction X and by a height of the region corresponding to N pixels in the sub-scanning direction Y, in the image matching processing described later, an image including the linear noise and having an M pixel×N pixel size over the first image 81a is shifted over the second image 81b. The image matching processing will be described later in detail.

When a plurality of the linear noises are extracted from the first image 81a by the noise extraction processing S2 described above, the noise extraction unit 71 may determine the image matching region for each of the linear noises but, more preferably, a region including the plurality of linear noises may appropriately be determined to be the image matching region, the reason of which will be described later.

(Displacement Detection Processing)

The displacement detection processing S3 is processing to be performed by the displacement detection unit 73.

Figure 12:
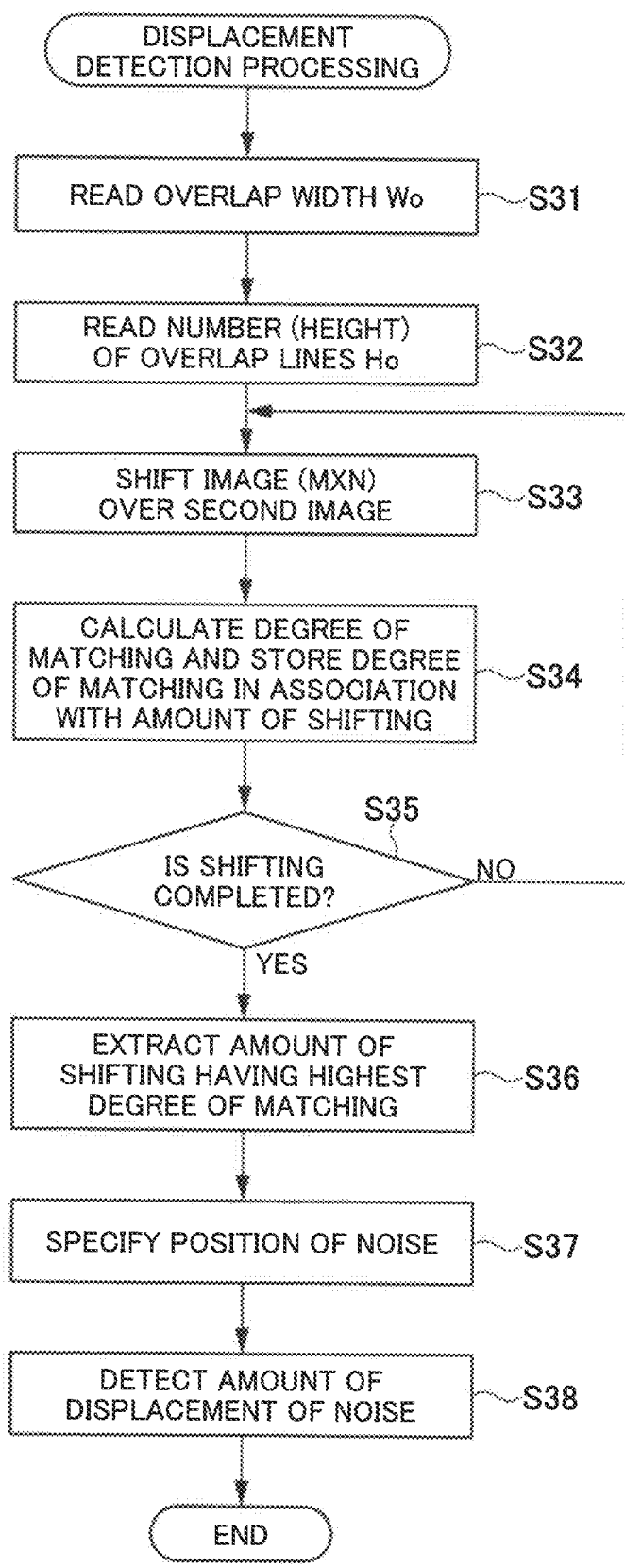
FIG. 12 is a flow chart illustrating the procedure of displacement detection processing.

FIG. 12 is a flow chart illustrating the procedure of the displacement detection processing S3.

First, the displacement detection unit 73 reads, from the storage unit 58, an overlap width Wo (see FIG. 13) over which the first image 81a and the second image 81b overlap each other in the main scanning direction X (Step S31). As illustrated in FIG. 8 described above, the overlap width Wo corresponds to a width over which respective regions to be read by the first read sensor 62a and the second read sensor 62b overlap each other in the main scanning direction X when the image formation surface 15c of the paper 15 having the maximum width is read by the first and second read sensors 62a and 62b, i.e., the entire width of the paper 15. A specific numerical value of the overlap width Wo is set in advance depending on the maximum width of the paper 15 used in the image formation device 10 and on a positional relationship between the conveyance drum 20 and the image reading unit 24, i.e., machine design values of the image formation unit 12. Note that, in the first image 81a and the second image 81b each illustrated in FIG. 13, an image portion falling out of the overlap width Wo is the image portion obtainable through reading of a portion falling out of the paper 15 having the maximum width in the main scanning direction X by the first read sensor 62a and the second read sensor 62b.

Next, the displacement detection unit 73 reads, from the storage unit 58, the number of overlap lines Ho (see FIG. 13) in which the first image 81a and the second image 81b overlap each other in the sub-scanning direction Y (Step S32). The number of the overlap lines Ho corresponds to the number of lines in which the respective regions to be read by the first read sensor 62a and the second read sensor 62b overlap each other in the sub-scanning direction Y, i.e., a height of the image when the image formation surface 15c of the paper 15 conveyed by the conveyance drum 20 is read by the first read sensor 62a and the second read sensor 62b. When the maximum length of the paper 15 used in the image formation device 10 in the sub-scanning direction Y is assumed to be Lmax, the number of the overlap lines Ho is set in advance under the condition that the number of the overlap lines Ho is less than the number of lines required by the read sensor 62 (62a or 62b) to read the entire region of the image formation surface 15c of the paper 15 having the maximum length Lmax. The number of the overlap lines Ho is also set in advance under the condition that the number of the overlap lines Ho is equal to or larger than the number of lines required to determine the amount of displacement of the noise resulting from the parallax between the first read sensor 62a and the second read sensor 62b.

Figure 13:
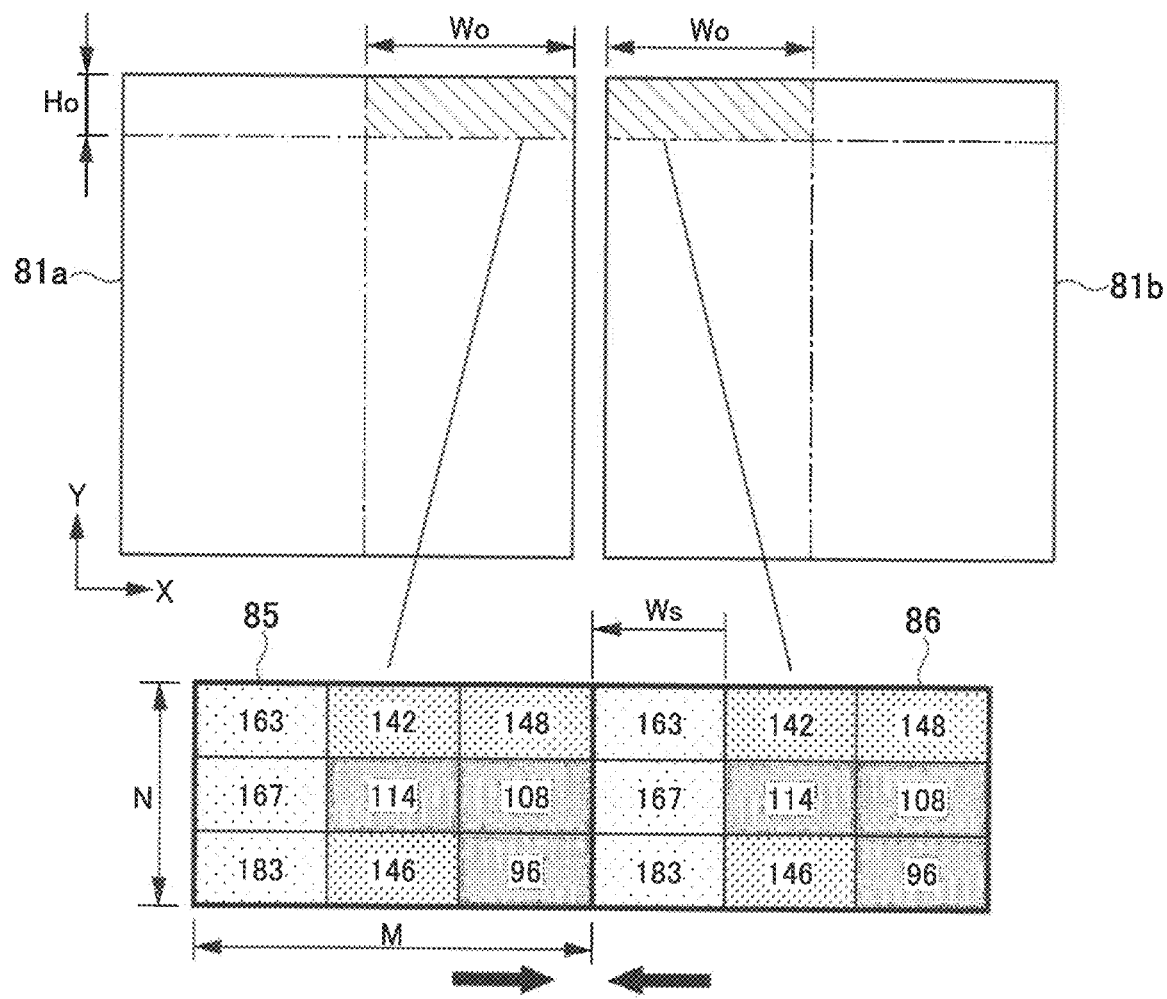
FIG. 13 is a schematic diagram illustrating image matching processing.

As illustrated in FIG. 13, the first image 81a and the second image 81b have respective regions (Wo×Ho) each defined by the overlap width Wo and the number of overlap lines Ho which are at positions opposite to each other in the main scanning direction X. In other words, in the first image 81a, the position of the region (Wo×Ho) is located on one side (right side in FIG. 13) in the main scanning direction X while, in the second image 81b, the position of the region (Wo×Ho) is located on the other side (left side in FIG. 13) in the main scanning direction X. This is because, as illustrated in FIG. 8, the first read sensor 62a and the second read sensor 62b are disposed at positions displaced from each other in the main scanning direction X and, due to the displacement between the sensors, positions of images representing a result of the reading of the image formation surface 15c of the paper 15 are opposite to each other in the main scanning direction X.

Then, the displacement detection unit 73 performs, for the first image 81a and the second image 81b, image matching processing on the regions (Wo×Ho) defined by the overlap width Wo and the number of overlap lines Ho which are read from the storage unit 58 in Steps S31 and S32 described above (Steps S33 to S35). As an example of the image matching processing, region-based matching can be used.

In the image matching processing, first, the displacement detection unit 73 uses, as a template image, an M pixel×N pixel image 85 including the linear noises extracted by the noise extraction processing S2 described above, and shifts the image 85 over the second image 81b, as illustrated in FIG. 13 (Step S33). Values of the individual pixels in the image 85 represent density values (pixel values) after the gray scale conversion. The same applies also to an image 86 described later. A size of a region of the second image 81b over which the image 85 is shifted is given by Overlap Width Wo×Number of Overlap Lines Ho. A minimum amount of shifting per shifting operation corresponds to one pixel in each of the main scanning direction X and the sub-scanning direction Y. The amount of shifting per shifting operation may be set appropriately in consideration of accuracy of the image matching processing and a time required for the image matching processing. In the present embodiment, by way of example, it is assumed that the amount of shifting per shifting operation is one pixel (Ws) in the main scanning direction X and, after the image 85 is shifted over the second image 81b from a left end of the region (Wo×Ho) to a right end thereof, the image 85 is shifted by one pixel in the sub-scanning direction Y.

Then, the displacement detection unit 73 calculates a degree of matching between the image 85 serving as the template image and the image (target image) 86 to be subjected to matching with the image 85 at a post-shifting position on the second image 81b (Step S34). The post-shifting position corresponds to a position to which the image 85 is shifted over the second image 81b. As a method of calculating the degree of matching, for example, any of three methods described below may be used appropriately. The first method is a calculation method referred to as SSD (Sum of Squared Differences) which uses a square sum of pixel value differences as an index. The second method is a calculation method referred to as a SAD (Sum of Absolute Differences) which uses absolute value differences of pixel value differences as an index. The third method is a calculation method referred to as NCC (Normalized Cross Correlation) which uses a normalized function. In the present embodiment, it is assumed that, by way of example, the degree of matching between the images is calculated by a SAD-based calculation method.

In Step S34, the displacement detection unit 73 also stores, in the storage unit 58 (or the RAM 65), the degree of matching calculated at each of the post-shifting positions in association with the amount of shifting at which the degree of matching is obtained. The amount of shifting is stored in the storage unit 58 as information representing respective approximate distances over which the image 85 is shifted in the main scanning direction X and the sub-scanning direction Y from a reference position when, e.g., an upper left pixel position in the region (Xo×Ho) of the second image 81b is assumed to be the reference position.

Then, the displacement detection unit 73 determines whether or not the shifting of the image 85 is completed in the region (Wo×Ho) of the second image 81b (Step S35). Then, when the shifting is not completed, the processing returns to Step S33 described above, and, when the shifting is completed, the processing advances to subsequent Step S36.

In Step S36, the displacement detection unit 73 extracts the amount of shifting stored in the storage unit 58 in association with the highest one of the degrees of matching. In the SAD-based calculation method, the degree of matching between the image 85 serving as the template image and the image 86 serving as the target image is higher as a SAD-calculated value is smaller. Accordingly, in Step S36, the displacement detection unit 73 extracts the amount of shifting stored in the storage unit 58 in association with a minimum SAD-calculated value among the degrees of matching stored in the storage unit 58.

Then, the displacement detection unit 73 specifies, based on the amount of shifting extracted in Step S36 described above, a position on the second image 81b at which the noise (linear noise) extracted by the noise extraction processing S2 described above is present (Step S37).

Then, the displacement detection unit 73 detects an amount of displacement between a position on the first image 81a at which the noise extracted by the noise extraction processing S2 is present and the position on the second image 81b at which the noise extracted by the noise extraction processing S2 is present, i.e., the amount of displacement of the noise resulting from the parallax between the first read sensor 62a and the second read sensor 62b (Step S38). The amount of displacement of the noise resulting from the parallax is defined by a length direction of the imaging surface of the second read sensor 62b. The length direction of the imaging surface means a direction in which the photoelectric conversion elements are arranged.

Figure 14:
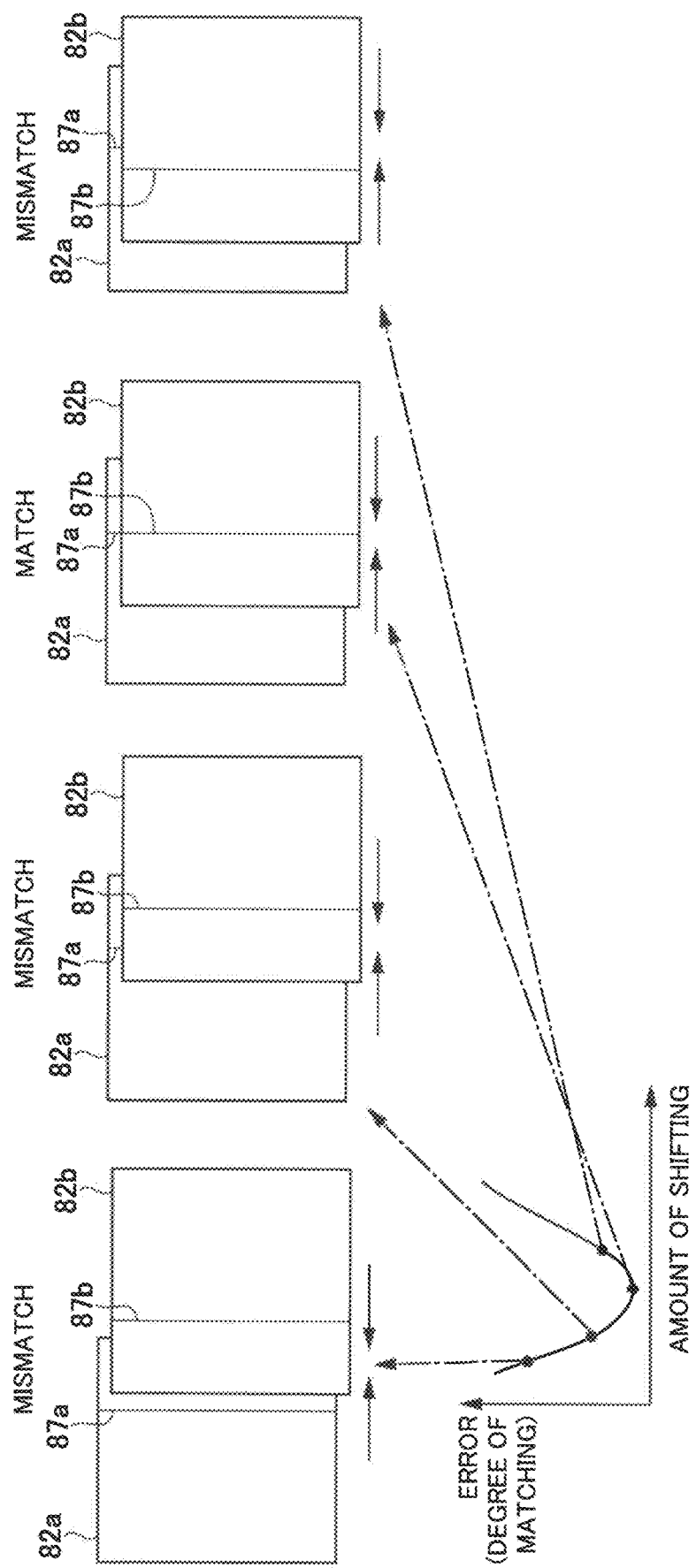
FIG. 14 is a schematic diagram illustrating a degree of matching between images in the image matching processing.

In a case of performing the matching processing on the first image 81a and the second image 81b by the displacement detection processing S3 described above as illustrated in FIG. 14, an error (degree of matching) when a position of a linear noise 87a present on the first image 81a does not match a position of a linear noise 87b present on the second image 81b in the main scanning direction X and an error (degree of matching) when the position of the linear noise 87a matches the position of the linear noise 87b in the main scanning direction X vary depending on the amount of shifting of the image. Consequently, in Step S36, the displacement detection unit 73 extracts the amount of shifting at which the error when the position of the linear noise 87a present on the first image 81a matches the position of the linear noise 87b present on the second image 81b, i.e., the degree of matching has a smallest value (minimum value).

When a plurality of linear noises are extracted from the first image 81a by the noise extraction processing S2 previously described and a region including the plurality of linear noises is determined to be the image matching region, the displacement detection unit 73 may appropriately specify a position on the second image 81b at which the image has a highest degree of matching with the image in the image matching region as a position at which the plurality of linear noises described above are present. The position at which the image has the highest degree of matching mentioned herein refers to a position on the image at which the SAD-calculated value is minimum, i.e., a position on the image corresponding to the amount of shifting at which the degree of matching between the image 85 serving as the template image and the image 86 serving as the target image is highest.

By thus collectively specifying the positions of the plurality of linear noises on the second image 81b, it is less likely to confuse a position of a given noise with a position of another noise present in the vicinity thereof than when the position of each of the plurality of linear noises is individually specified, and accordingly it is possible to more reliably specify the positions of the noises.

(Distance Calculation Processing)

The distance calculation processing S4 is processing to be performed by the distance calculation unit 74.

Figure 15:
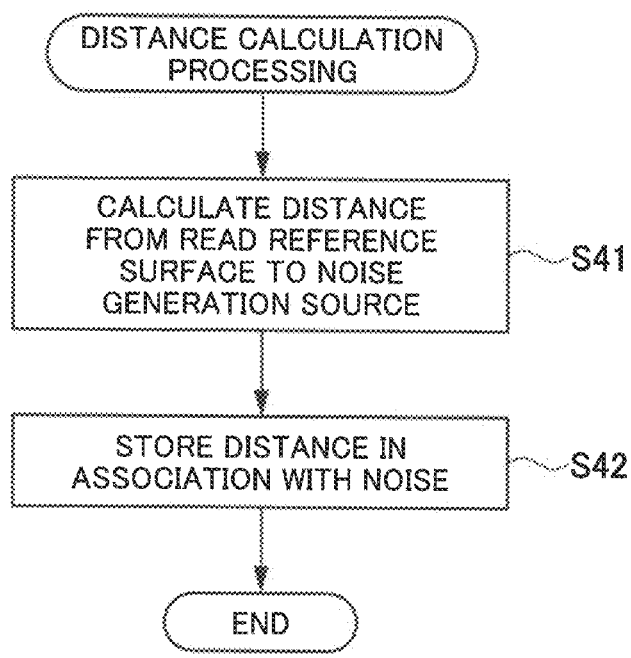
FIG. 15 is a flow chart illustrating the procedure of distance calculation processing.

FIG. 15 is a flow chart illustrating the procedure of the distance calculation processing S4.

Figure 16:
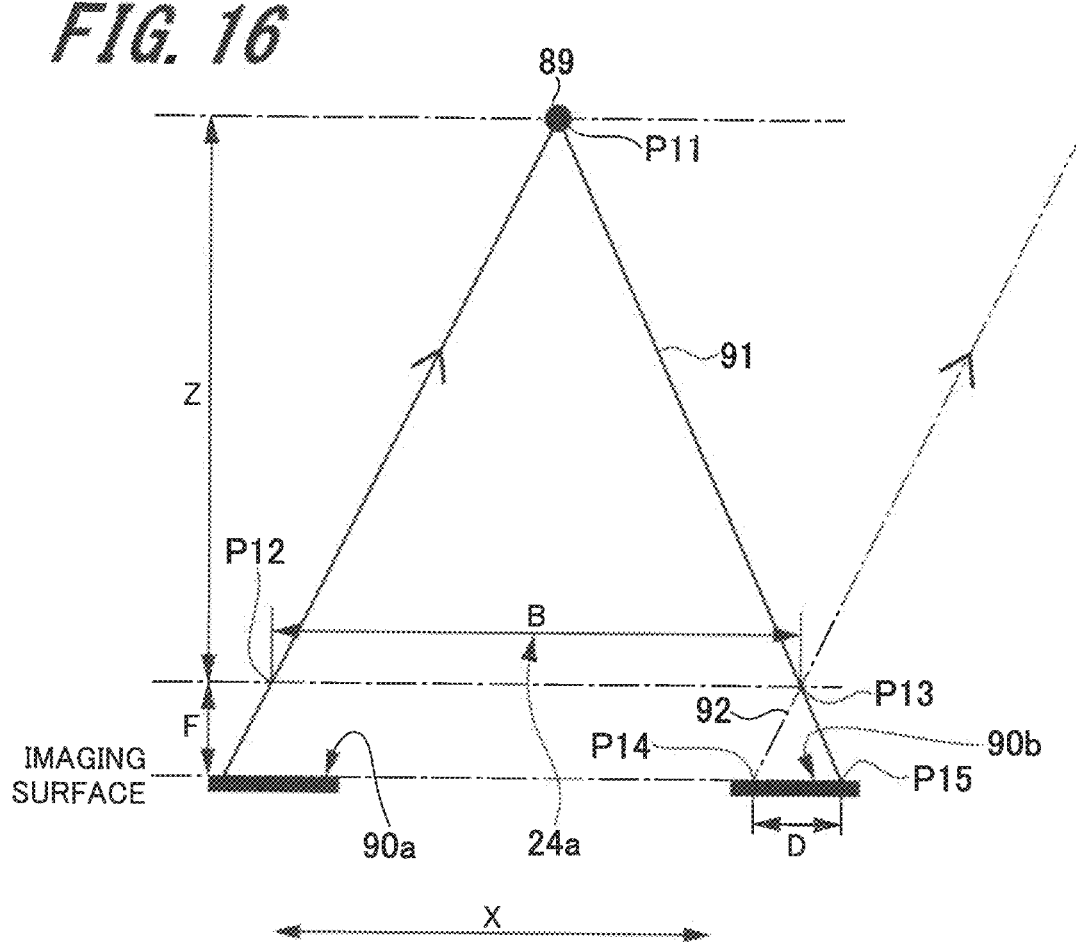
FIG. 16 is a diagram illustrating a state in which an image of an object serving as the generation source of the noise is focused on an imaging surface of a first read sensor and on an imaging surface of a second read sensor.

First, the distance calculation unit 74 calculates, based on a calculation formula using the amount of displacement of the noise detected by the displacement detection processing S3 described above as a parameter, the distance from the read reference surface 24a of the image reading unit 24 to the generation source of the noise (Step S41). Referring to FIG. 16, a detailed description will be given below of the calculation processing.

FIG. 16 illustrates a state in which an image of an object 89 corresponding to the generation source of the noise is focused on the imaging surface 90a of the first read sensor 62a and on the imaging surface 90b of the second read sensor 62b.

In FIG. 16, a reference mark B denotes a distance (hereinafter referred to also as a "camera-to-camera distance") between the first read sensor 62a and the second read sensor 62b in the main scanning direction X. The unit of the distance B is assumed to be millimeter.

A reference mark F denotes a focal point distance between the first reducing optical system 64a and the second reducing optical system 64b. The focal point distance F is a distance determined by optical characteristics of the condensing lenses used in the first reducing optical system 64a and the second reducing optical system 64b, which is known information. Specifically, the focal point distance F corresponds to each of distances from respective centers (main points) of the condensing lenses of the individual reducing optical systems 64a and 64b to the imaging surfaces 90a and 90b. Meanwhile, the read reference surface 24a of the image reading unit 24 is set at a position spaced apart from each of the imaging surfaces 90a and 90b by the focal point distance F in a direction perpendicular to the main scanning direction X. The focal point distance F may appropriately be stored in advance in the storage unit 58 and read as required from the storage unit 58. The unit of the focal distance F is assumed to be millimeter.

A reference mark D denotes an amount of displacement between a position on the imaging surface 90a of the first read sensor 62a at which an image of the object 89 is formed and a position on the imaging surface 90b of the second read sensor 62b at which an image of the object 89 is formed, i.e., an amount of displacement between the images of the object 89 resulting from the parallax between the first read sensor 62a and the second read sensor 62b. The unit of the amount of displacement D resulting from the parallax is assumed to be millimeter.

A reference mark Z denotes a distance from the read reference surface 24a of the image reading unit 24 to the object 89 in a direction perpendicular to the main scanning direction X. The unit of the distance Z is assumed to be millimeter. The distance Z can be determined based on Expression (1) below because a triangle 91 having three points P11, P12, and P13 as vertices thereof and a triangle 92 having three points P13, P14, and P15 having vertices thereof have a synonymous relationship therebetween.

$$Z = B \times F / D \quad (1)$$

The distance Z calculated based on Expression (1) above corresponds to the distance from the read reference surface 24a of the image reading unit 24 to the noise generation source when the object 89 is the noise generation source. This allows the distance calculation unit 74 to calculate the distance Z from the read reference surface 24a of the image reading unit 24 to the noise generation source.

After thus calculating the distance Z from the read reference surface 24a to the noise generation source, the distance calculation unit 74 stores, in the storage unit 58, the calculated distance Z in association with the noise (Step S42). As a result, when, e.g., six noises are extracted by the noise extraction processing, as illustrated in FIG. 17, six distances (mm) are stored in the storage unit 58 in association with the individual noises. In FIG. 17, the six noises are numbered with 1 to 6. The respective distances Z corresponding to the first, second, third, fourth, fifth, and sixth noises are 10.5 mm, 10 mm, 10.5 mm, 10.7 mm, 10.5 mm, and 10.7 mm, respectively.

FIG. 18 is a diagram illustrating dimensional relations among individual portions of the image reading unit 24 in the image formation device 10 according to the embodiment of the present invention.

As illustrated in FIG. 18, the camera-to-camera distance B is 10 mm, the focal point distance F is 3 mm, and each of the distances B and F is constant. By contrast, the distance Z described above varies depending on the amount of displacement D of the noise resulting from the parallax. Specifically, as the amount of displacement D of the noise resulting from the parallax is smaller, the distance Z is longer. When the distance from the read reference surface 24a of the image reading unit 24 to the image formation surface 15c of the paper 15 is 10.5 mm in terms of machine design of the image formation device 10, it is possible to determine whether or not a noise is present on the image formation surface 15c depending on whether the distance Z calculated by the distance calculation processing S4 described above is equal to 10.5 mm or longer or shorter than 10.5 mm by a predetermined amount.

Specifically, when the distance (hereinafter referred to also as the "calculated distance") calculated by the distance calculation processing S4 is equal to 10.5 mm, it can be determined that a noise is present on the image formation surface 15c. When the calculated distance Z is shorter than 10.5 mm by a predetermined amount, it can be determined that a noise is present on a front side of the image formation surface 15c. When the calculated distance Z is longer than 10.5 mm by a predetermined amount, it can be determined that a noise is present on a rear side of the image formation surface 15c. A description will be given below of the noise determination processing based on such a determination criterion. The predetermined amount is determined by a position of the heat transfer prevention sheet 27 or a position of the reading plate 66. This is because the foreign substance 80 adhering to the reading plate 66 or the surface pattern of the heat transfer prevention sheet 27 may serve as the noise generation source.

(Noise Determination Processing)

The noise determination processing S5 is processing to be performed by the noise determination unit 75.

Figure 19:
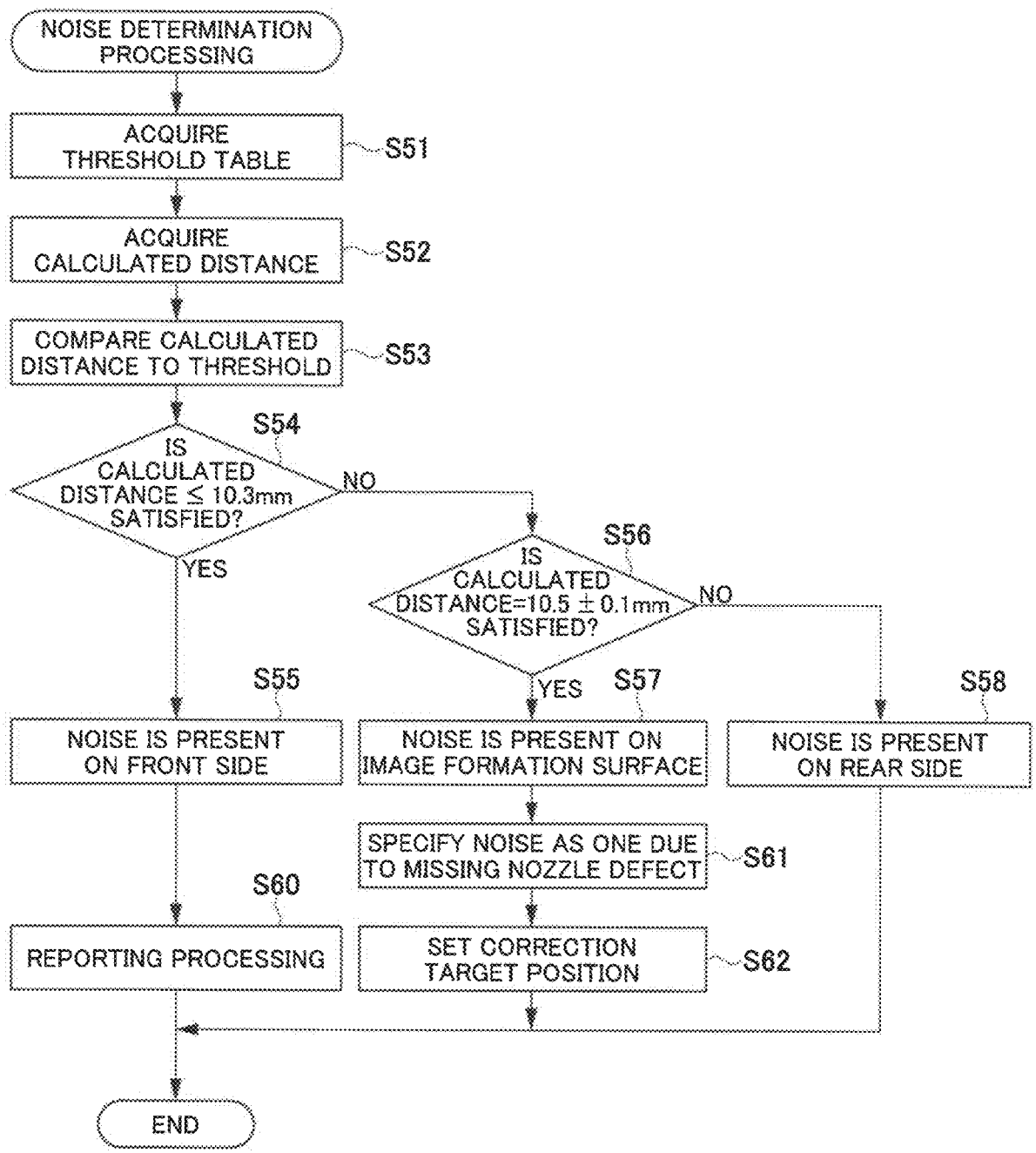
FIG. 19 is a flow chart illustrating the procedure of noise determination processing.

FIG. 19 is a flow chart illustrating the procedure of the noise determination processing S5.

First, the noise determination unit 75 acquires a threshold table stored in the storage unit 58 in association with the thickness of the paper 15 by reading the threshold table from the storage unit 58 (Step S51). The thickness of the paper 15 may be detected appropriately by providing the image formation unit 12 with a paper thickness detection unit 18, as illustrated in FIG. 2, and by using the paper thickness detection unit 18. As a configuration of the paper thickness detection unit 18, a configuration can be used in which, e.g., the paper 15 is interposed between a pair of thickness detection rollers including a fixed roller and a movable roller, and an amount of displacement of the movable roller at that time is detected with a sensor or the like.

FIG. 20 is a diagram illustrating an example of the threshold table.

The threshold table illustrated in FIG. 20 roughly includes three thresholds. The first threshold is a threshold for determining whether or not a noise is present on the front side of the image formation surface 15c of the paper 15. The first threshold is set to "10.3 mm or less". The second threshold is a threshold for determining whether or not a noise is present on the image formation surface 15c of the paper 15. The second threshold is set to "10.5±0.1 mm". The third threshold is a threshold for determining whether or not a noise is present on the rear side of the image formation surface 15c of the paper 15. The third threshold is set to "10.7 mm or more". Each of the thresholds defines the distance from the read reference surface 24a to the noise generation source.

The second threshold may be set to THRESHOLD=10.5 mm when the distance from the read reference surface 24a to the image formation surface 15c is 10.5 mm in terms of mechanical design of the image reading unit 24, or may also be set to THRESHOLD=10.5±0.1 mm by taking a margin considering a predetermined error into account. The predetermined error includes a dimensional error of each component of the image reading unit 24 or the like. The threshold table illustrated in FIG. 20 shows an example in which the margin is set to 0.1 mm by way of example, and a second threshold is set by taking the margin into account.

The threshold table described above is set such that the position at which a noise is present is categorized depending on the case where the distance from the read reference surface 24a to the noise generation source is not less than 10.4 and not more than 10.6 mm (10.5±0.1 mm), the case where the distance is not more than 10.3 mm, or the case where the distance is not less than 10.7 mm. Specifically, the threshold table is set such that, when the distance from the read reference surface 24a to the noise generation source is not less than 10.4 mm and not more than 10.6 mm, the noise is categorized as one present on the image formation surface 15c of the paper 15, when the distance is not more than 10.3 mm, the noise is categorized as one present on the front side of the image formation surface 15c of the paper 15, and when the distance is not less than 10.7 mm, the noise is categorized as one present on the rear side of the image formation surface 15c of the paper 15.

Note that, when the thickness of the paper 15 detected by the paper thickness detection unit 18 is larger, the position of the image formation surface 15c of the paper 15 is closer to the read reference surface 24a of the image reading unit 24. Meanwhile, when the thickness of the paper 15 detected by the paper thickness detection unit 18 is smaller, the position of the image formation surface 15c of the paper 15 is more distant from the read reference surface 24a of the image reading unit 24. Accordingly, in the storage unit 58, a plurality of the threshold tables are stored in advance in association with the various thicknesses of the paper 15. Then, the noise determination unit 75 acquires the threshold table by reading, from the storage unit 58, the threshold table stored in the storage unit 58 in association with the thickness of the paper 15 detected by the paper thickness detection unit 18. The acquisition of the threshold table read from the storage unit 58 by the noise determination unit 75 corresponds to setting thresholds for determining whether or not a noise is present on the image formation surface 15c.

Then, by the distance calculation processing S4 described above, the noise determination unit 75 acquires the calculated distance Z by reading, from the storage unit 58, the calculated distance Z stored in the storage unit 58 in association with the noise (Step S52).

Then, the noise determination unit 75 compares the calculated distance Z acquired in Step S52 to the thresholds set to the threshold table (Step S53) and categorizes the position at which the noise is present based on a result of the comparison. For example, in the case of using the threshold table illustrated in FIG. 20, in the noise determination unit 75, YES is given as an answer in Step S54 when the calculated distance Z is not more than 10.3 mm and then categorizes the noise as one present on the front side of the image formation surface 15c of the paper 15 (Step S55). Meanwhile, when the calculated distance Z exceeds 10.3 mm, in the noise determination unit 75, NO is given as an answer in Step S54 and proceeds to processing in Step S56.

Then, the noise determination unit 75 gives YES as an answer in Step S56 when the calculated distance Z is not less than 10.4 mm and not more than 10.6 mm, and then categorizes the noise as one present on the image formation surface 15c of the paper 15 (Step S57). Meanwhile, when the calculated distance Z exceeds 10.6 mm, the noise determination unit 75 gives NO as an answer in Step S56, proceeds to processing in Step S58, and categorizes the noise as one present on the rear side of the image formation surface 15c of the paper 15 (Step S58).

In such categorization processing, it may also be possible to allow a notification unit to notify the user whether or not a noise is present on the image formation surface 15c. The notification unit can be formed of, e.g., the operation/display unit 53. When the notification unit is formed of the operation/display unit 53, a message telling whether or not a noise is present on the image formation surface 15c may be displayed appropriately on the operation/display unit 53.

In the categorization processing described above, when a noise is categorized as one present on the front side of the image formation surface 15c of the paper 15, it is highly possible that a cause of the noise is the foreign material 80 adhering to the reading plate 66. Accordingly, the noise determination unit 75 performs, as processing after the processing in Step S55 is performed, reporting processing of encouraging the user to perform a predetermined maintenance operation (Step S60). The predetermined maintenance operation includes an operation of checking whether or not the foreign substance 80 adheres to the reading plate 66 of the image reading unit 24 and an operation of removing the foreign substance 80 adhering to the reading plate 66. Examples of the reporting processing include processing of displaying a message on the operation/display unit 53, processing of transmitting the message from the communication unit 59 to a terminal device held by the user to cause a display screen of the terminal device to display the message, and the like. Alternatively, the reporting processing may also be processing of outputting a sound.

When a noise is categorized as one present on the rear side of the image formation surface 15c of the paper 15, a conceivable cause of the noise is unexpected imaging of the conveyance drum 20 or the heat transfer prevention sheet 27 appearing as the noise. In that case, the noise determination processing S5 is immediately ended.

Meanwhile, when a noise is categorized as one present on the image formation surface 15c of the paper 15, the noise determination unit 75 specifies a cause of the noise as the missing nozzle defect 17 (Step S61). Then, the noise determination unit 75 sets the position of the noise the cause of which is specified as the missing nozzle defect 17 to a target position to be subjected to correction by the image correction unit 76 (Step S62).

Note that the noise determination unit 75 may also have a threshold setting function as described below. The threshold setting function is a function of setting the thresholds based on the first image 81a and the second image 81b which are obtained through reading of the image on the paper 15 including the missing noise defect 17 by the first read sensor 62a and the second read sensor 62b. Specifically, before the processing illustrated in FIG. 10 is started, the image on the paper 15 including the missing nozzle defect 17 is read by the first read sensor 62a and the second read sensor 62b. At this time, each of the first image 81a obtained by the first read sensor 62a and the second image 81b obtained by the second read sensor 62b includes the noise due to the missing nozzle defect 17. The position of the noise on the first image 81a and the position of the noise on the second image 81b are displaced from each other in the main scanning direction. Accordingly, the noise determination unit 75 causes the displacement detection unit 73 to detect an amount of displacement between the noise on the first image 81a and the noise on the second image 81b and gives the amount of displacement as a result of the detection to the distance calculation unit 74 to cause the distance calculation unit 74 to calculate the distance from the read reference surface 24a to the noise generation source. Then, the noise determination unit 75 sets the distance as a result of the calculation by the distance calculation unit 74 or a value obtained by adding a margin to the distance as the second threshold. In addition, the noise determination unit 75 sets the first threshold to a value less than the second threshold and also sets the third threshold to a value exceeding the second threshold. By providing the noise determination unit 75 with such a threshold setting function, even when the thickness of the paper 15 cannot be specified, it is possible to appropriately set the thresholds based on the thickness of the paper 15.

The noise determination unit 75 having the threshold setting function may also be configured to set the thresholds based on the first image 81a and the second image 81b each obtained by the first read sensor 62a and the second read sensor 62b through reading of the image on the paper 15 including a pattern which allows the parallax to be specified (hereinafter referred to as the "parallax specification pattern"), instead of the image 16 on the paper 15 including the missing nozzle defect 17 described above. In this configuration, each of the first image 81a obtained by the first read sensor 62a and the second image 81b obtained by the second read sensor 62b includes a noise due to the parallax specification pattern. Accordingly, the noise determination unit 75 can set the threshold by the same method as described above. The parallax specification pattern may be any pattern as long as the pattern allows the parallax to be specified. By way of example, as the parallax specification pattern, a linear pattern parallel with the sub-scanning direction Y can be used.

(Image Correction Processing)

The image correction processing is processing to be performed by the image correction unit 76. The image correction unit 76 performs the image correction processing only when it is determined by the noise determination processing S5 described above that a noise is present on the image formation surface 15c. The image correction processing is processing of correcting a missing portion of the image due to the missing nozzle defect 17. The image correction unit 76 performs the image correction processing by the noise determination processing S5 described above on the assumption that a position of a noise specified as a noise due to the missing nozzle defect 17 is a correction target position. The position of the noise due to the missing nozzle defect 17 corresponds to a position of the one of the nozzles 244 in which an ink ejection failure has occurred when an image is formed on the paper 15.

Accordingly, in the image correction process, the image correction unit 76 first specifies, based on the position of the noise due to the missing nozzle defect 17, the position of the nozzle 244 in which the ink ejection failure has occurred. In the present embodiment, by way of example, it is assumed that, the ink ejection failure has occurred in a nozzle 244a among the plurality of nozzles 244 illustrated in FIG. 4.

Then, the image correction unit 76 changes conditions under which the head drive unit 55 drives the ink-jet head 32 such that the nozzle 244 adjacent to the nozzle 244a corresponding to a faulty nozzle or the nozzle 244 serving as a substitute for the nozzle 244a compensates for an image to be formed by the nozzle 244a. As a result, when the image is formed on the paper 15 conveyed after the paper 15 with the missing nozzle defect 17, it is possible to eliminate or reduce the occurrence of the missing nozzle defect 17 due to the faulty nozzle. Therefore, it is possible to prevent degradation of an image quality resulting from the ink ejection failure during a period until the nozzle ejection failure is eliminated.

(Image Quality Adjustment Processing)

Image quality adjustment processing is processing to be performed by the image quality adjustment unit 77.

The image quality adjustment unit 77 performs image quality adjustment based on the first image 81a obtained by the first read sensor 62a and/or on the second image 81b obtained by the second read sensor 62b. At that time, as illustrated in FIG. 8, when the foreign substance 80 adheres to the reading plate 66, the foreign substance 80 causes a noise in each of the first image 81a and the second image 81b. The noise appears as a partially missing portion of the image. Consequently, when the image quality adjustment unit 77 performs the image quality adjustment based on the first image 81a, information required for the image quality adjustment cannot be obtained from a portion of the first image 81a in which the noise is observed.

Accordingly, the image quality adjustment unit 77 according to the present embodiment compensates for the portion with the noise present in one of the first image 81a and the second image 81b with a portion of the other image corresponding to a position of the noise to perform the image quality adjustment. When the image formation surface 15c of the paper 15 is to be read with the image reading unit 24, the first read sensor 62a and the second read sensor 62b simultaneously image the image formation surface 15c of the paper 15 in different directions. As a result, when the foreign substance 80 adheres to the reading plate 66 as illustrated in FIG. 8, the position of the noise appearing in the first image 81a, while being blocked by the foreign substance 80, is different from the position of the noise appearing in the second image 81b, while being blocked by the foreign substance 80. In other words, the portion of the image blocked by the foreign substance 80 and invisible to the first read sensor 62a is visible to the second read sensor 62b without being blocked by the foreign substance 80. Likewise, the portion of the image blocked by the foreign substance 80 and invisible to the second read sensor 62b is visible to the first read sensor 62a without being blocked by the foreign substance 80. In other words, a missing portion of one of the first image 81a and the second image 81b which corresponds to a noise is viewed as a normal portion with no missing part in the other image.

Accordingly, when the image quality adjustment is performed based on e.g., the first image 81a, even though the foreign substance 80 causes a noise in the first image 81a, the image adjustment unit 77 compensates for the portion with the noise, i.e., the missing portion of the image with a portion of the second image 81b corresponding to a position of the noise. This allows the image quality adjustment unit 77 to perform the image quality adjustment based on the image with no missing portion. As a result, it is possible to implement excellent image quality adjustment highly resistant to a noise.

Effects of Embodiment

As described above, in the embodiment of the present invention, the amount of noise displacement resulting from the parallax between the first read sensor 62a and the second read sensor 62b is determined based on the first image 81a obtained by the first read sensor 62a and on the second image 81b obtained by the second read sensor 62b and, based on the determined amount of displacement, it is determined whether or not a noise is present on the image formation surface 15c. This allows a noise due to the missing nozzle defect 17 to be discriminatively recognized from the other noise. As a result, when the image 16 on the paper 15 is to be read with the image reading unit 24, it is possible to more reliably determine whether or not the noise included in each of the images 81a and 81b obtained as a result of the reading is a noise due to the ink ejection failure in the nozzle.

Modifications

The technical scope of the present invention is by no means limited by the embodiment described above, and includes even a mode obtained by adding various changes and improvements to the embodiment described above in a scope which allows specific effects obtainable with constituent features of the invention or a combination thereof to be derived.

For example, the image formation device 10 may also have a configuration which includes a paper determination unit that determines whether or not the paper 15 to be subjected to reading by the image reading unit 24 has a light transmissivity and in which, when the paper 15 has no light transmissivity in a result of the determination by the paper determination unit, the distance calculation unit 74 calculates the distance Z within a range of not more than a threshold defining the distance from the read reference surface 24a to the image formation surface 15 and, when the paper 15 has a light transmissivity, the distance calculation unit 74 calculates the distance Z within a range of not more than the foregoing threshold and exceeding the foregoing threshold. By using such a configuration, it is possible to reduce a processing load placed on arithmetic operations performed by the distance calculation unit 74.

Note that the threshold defining the distance from the read reference surface 24a to the image formation surface 15c refers to the second threshold described above. The paper determination unit may also be configured to include, e.g., a transmission-type photosensor having a light emitting unit and a light receiving unit facing each other via the paper conveyance path, allow the light receiving unit to receive light emitted from the light emitting unit and transmitted by the paper 15, and determine whether or not the paper 15 has a light transmissivity based on an amount of the received light. Alternatively, the paper determination unit may also be configured to determine whether or not the paper 15 has a light transmissivity based on information related to the paper 15 that has been input by the user by operating the operation/display unit 53.

Alternatively, the image formation device 10 may also have a configuration which includes a paper size detection unit that detects a size of the paper 15 and in which the noise extraction unit 71 determines a target region from which a noise is to be extracted based on the size of the paper 15 detected by the paper size detection unit. By using such a configuration, when the size of the paper 15 is large, it is possible to ensure the larger-sized target region from which a noise is to be extracted while, when the size of the paper 15 is small, it is possible to provide the smaller-sized target region from which a noise is to be extracted. Therefore, it is possible to efficiently perform the noise extraction processing, while reliably extracting the noise included in the first image 81a.

Note that the paper size detection unit may also have a configuration which includes, e.g., a linear image sensor disposed to face a direction perpendicular to a widthwise end portion of the paper 15 passing through the paper conveyance path and in which the size of the paper 15 in a paper width direction is detected based on a position of the widthwise end portion of the paper 15 which is detected by the linear image sensor. Alternatively, the paper size detection unit may also be configured to detect the size of the paper 15 based on information related to the paper 15 that has been input by the user by operating the operation/display unit 53.

In the embodiment described above, the read sensor 62a as one of the two read sensors 62a and 62b provided in the image reading unit 24 is used as the first read sensor and the read sensor 62b as the other read sensor is used as the second read sensor, but the present invention is not limited thereto. In other words, it may also be possible to use the read sensor 62b as the first read sensor and use the read sensor 62a as the second read sensor.

In the embodiment described above, the conveyance drum 20 has been described as an example of the sheet conveyer, but the present invention is not limited thereto. The present invention is also applicable to a sheet conveyer including a conveyance belt.

Also, in the embodiment described above, a description has been given of the case where the noise determination unit 75 has the threshold setting function, but the present invention is not limited thereto. It may also be possible that a threshold setting unit is provided separately from the noise determination unit 75, and the noise determination unit 75 determines, based on the thresholds set by the threshold setting unit, whether or not a noise is present on the image formation surface.

Also, in the example shown in the embodiment described above, the image formation unit 12 is provided with the paper thickness detection unit 18, but the present invention is not limited thereto. For example, when the user operates the operation/display unit 53 to input information about the paper 15 and the thickness of the paper 15 can be detected from the input information, the operation/display unit 53 is allowed to function as the paper thickness detection unit. As the information about the paper 15 input by the user, information such as a type or brand of the paper 15 can be considered.

Each of the displacement detection processing, the distance calculation processing, and the noise determination processing is performed for each noise extracted by the noise extraction processing. When a plurality of noises are extracted by the noise extraction processing, it may be possible to sequentially perform the displacement detection processing, the distance calculation processing, and the noise determination processing for the plurality of noises. Alternatively, it may also be possible to perform the displacement detection processing, the distance calculation processing, and the noise determination processing for one of the noises, and then perform the displacement detection processing, the distance calculation processing, and the noise determination processing for each of the other noises in the same manner as for the preceding noise.

The present invention can be implemented not only as the image formation device, but also an image reading device, an image reading method, or a non-transitory recording medium storing a computer readable program, and can also be implemented as an image forming method. When the present invention is implemented as the image reading device, the image reading device is configured to include at least the image reading unit 24 and the control unit 51.

While the present specification has used terms such as "parallel" and "perpendicular", each of the terms does not mean only "parallel" or "perpendicular" in a strict sense, but also means, in addition to "parallel" or "perpendicular" in a strict sense, "substantially parallel" or "substantially perpendicular" within a range where the functions can be exhibited.

Although embodiments of the present invention have been described and illustrated in detail, the disclosed embodiments are made for purposes of illustration and example only and not limitation. The scope of the present invention should be interpreted by terms of the appended claims.

REFERENCE SIGNS LIST

10 Image formation device
15 Paper (Sheet)
15c Image formation surface
17 Missing nozzle defect
18 Paper thickness detection unit (Sheet thickness detection unit)
20 Conveyance drum (Sheet conveyer)
24 Image reading unit
24a Read reference surface
51 Control unit
53 Operation/display unit (Notification unit)
62 Read sensor
62a First read sensor
62b Second read sensor
64 Reducing optical system
64a First reducing optical system
64b Second reducing optical system
71 Noise extraction unit
73 Displacement detection unit
74 Distance calculation unit
75 Noise determination unit
76 Image correction unit
77 Image quality adjustment unit
81a First image
81b Second image
82, 83, 84 Noise
X Main scanning direction

What is claimed is:

1. An image reading device comprising:
an image reading unit that reads an image formation surface of a sheet by using a reducing optical system; and
a control unit, wherein
the image reading unit includes a plurality of read sensors disposed at positions displaced from each other in a main scanning direction,
the plurality of read sensors are disposed to be able to read the image formation surface by using at least a local region of the image formation surface as a common region to be read, and the control unit determines, based on a first image obtained by a first read sensor included in the plurality of read sensors and on a second image obtained by a second read sensor included in the plurality of read sensors and different from the first read sensor, an amount of displacement of a noise resulting from a parallax between the first read sensor and the second read sensor and determines, based on the amount of displacement, whether or not the noise is present on the image formation surface.

2. The image reading device according to claim 1, wherein the control unit includes:
a noise extraction unit that extracts the noise from the first image;
a displacement detection unit that specifies a position on the second image at which the noise extracted by the noise extraction unit is present and detects, based on information about the specified position, an amount of displacement corresponding to an amount of displacement between a position on the first image at which the noise is present and the position on the second image at which the noise is present;
a distance calculation unit that calculates a distance from a read reference surface of the image reading unit to a generation source of the noise based on the amount of displacement detected by the displacement detection unit; and
a noise determination unit that determines whether or not the noise is present on the image formation surface based on the distance calculated by the distance calculation unit.

3. The image reading device according to claim 2, wherein the noise determination unit sets a threshold for determining whether or not the noise is present on the image formation surface.

4. The image reading device according to claim 3, wherein the noise determination unit sets the threshold based on the first image and the second image which are obtained through reading of an image on the sheet including a missing nozzle defect by the first read sensor and the second read sensor.

5. The image reading device according to claim 3, further comprising:
a sheet thickness detection unit that detects a thickness of the sheet, wherein
the noise determination unit sets the threshold based on the thickness of the sheet detected by the sheet thickness detection unit.

6. The image reading device according to claim 3, wherein the noise determination unit sets the threshold based on the first image and the second image which are obtained by the first read sensor and the second read sensor through reading of an image on the sheet including a pattern that allows the parallax to be specified.

7. The image reading device according to claim 3, further comprising:
a sheet determination unit that determines whether or not the sheet to be subjected to the reading by the image reading unit has a light transmissivity, wherein,
when the sheet has no light transmissivity in a determination result from the sheet determination unit, the distance calculation unit calculates a distance from the read reference surface to the image formation surface within a range of not more than a threshold defining the distance and, when the sheet has a light transmissivity in the determination result from the sheet determination unit, the distance calculation unit calculates the distance within a range of not more than the threshold and exceeding the threshold.

8. The image reading device according to claim 3, wherein the noise determination unit determines whether or not the noise is present on the image formation surface based on a result of a comparison between the distance calculated by the distance calculation unit and the threshold.

9. The image reading device according to claim 2, further comprising:
a sheet size detection unit that detects a size of the sheet, wherein
the noise extraction unit determines a region from which the noise is to be extracted depending on the size of the sheet detected by the sheet size detection unit.

10. The image reading device according to claim 2, wherein the displacement detection unit specifies the position on the second image at which the noise extracted by the noise extraction unit is present by image matching processing.

11. The image reading device according to claim 10, wherein the displacement detection unit performs the image matching processing on a region set in advance.

12. The image reading device according to claim 10, wherein
the noise extraction unit determines, when a plurality of the noises are extracted from the first image, a region including the plurality of noises to be an image matching region, and
the displacement detection unit specifies a position on the second image at which the image has a highest degree of matching with an image in the image matching region as a position at which the plurality of noises are present.

13. The image reading device according to claim 2, wherein the noise extraction unit detects a linear noise as the noise.

14. The image reading device according to claim 2, wherein the noise extraction unit extracts at least any one of a noise due to mist, dust, or paper powder present between the image formation surface of the sheet and the read reference surface of the image reading unit, a noise due to a missing nozzle defect appearing on the image formation surface of the sheet, a noise due to a sheet conveyer that conveys the sheet, and a noise due to a heat transfer prevention sheet covering a surface of the sheet conveyer.

15. The image reading device according to claim 2, wherein the noise determination unit performs reporting processing of encouraging a user to perform a predetermined maintenance operation when determining that the noise is present on a front side of the image formation surface when viewed from the read sensor.

16. The image reading device according to claim 1, further comprising:
a notification unit that notifies a user whether or not the noise is present on the image formation surface.

17. An image reading method using an image reading device including an image reading unit that reads an image formation surface of a sheet by using a reducing optical system and includes a plurality of read sensors disposed at positions displaced from each other in a main scanning direction, the plurality of read sensors being disposed to be able to read the image formation surface by using at least a local region of the image formation surface as a common region to be read, the image reading method comprising:
determining, based on a first image obtained by a first read sensor included in the plurality of read sensors and on a second image obtained by a second read sensor included in the plurality of read sensors and different from the first read sensor, an amount of displacement of a noise resulting from a parallax between the first read sensor and the second read sensor; and determining, based on the amount of displacement, whether or not the noise is present on the image formation surface.

18. A non-transitory recording medium storing a computer readable program for causing a computer of an image reading device including an image reading unit that reads an image formation surface of a sheet by using a reducing optical system and includes a plurality of read sensors disposed at positions displaced from each other in a main scanning direction, the plurality of read sensors being disposed to be able to read the image formation surface by using at least a local region of the image formation surface as a common region to be read, to execute:

determining, based on a first image obtained by a first read sensor included in the plurality of read sensors and on a second image obtained by a second read sensor included in the plurality of read sensors and different from the first read sensor, an amount of displacement of a noise resulting from a parallax between the first read sensor and the second read sensor; and determining, based on the amount of displacement, whether or not the noise is present on the image formation surface.

19. An image formation device that causes each of a plurality of nozzles to eject ink to form an image on a sheet, the image formation device comprising:

an image reading unit that reads an image formation surface of the sheet by using a reducing optical system; and a control unit, wherein the image reading unit includes a plurality of read sensors disposed at positions displaced from each other in a main scanning direction, the plurality of read sensors are disposed to be able to read the image formation surface by using at least a local region of the image formation surface as a common region to be read, and the control unit determines, based on a first image obtained by a first read sensor included in the plurality of read sensors and on a second image obtained by a second read sensor included in the plurality of read sensors and different from the first read sensor, an amount of displacement of a noise resulting from a parallax between the first read sensor and the second read sensor and determines, based on the amount of displacement, whether or not the noise is present on the image formation surface.

20. The image formation device according to claim 19, further comprising:

an image correction unit that corrects a missing portion of an image due to a missing nozzle defect, wherein the image correction unit performs the correction only when it is determined that the noise is present on the image formation surface.

21. The image formation device according to claim 19, further comprising:

an image quality adjustment unit that adjusts a quality of the image formed on the sheet, wherein the image quality adjustment unit compensates for a portion of a noise observed in one of the first image and the second image with a portion of the other image corresponding to a position of the noise, to perform the image quality adjustment.

* * * * *